United States Patent
Marcus et al.

(10) Patent No.: US 6,236,716 B1
(45) Date of Patent: May 22, 2001

(54) CALL PARKING AND PAGING SYSTEM AND METHOD OF OPERATION

(75) Inventors: Nicholas R. D. Marcus, Lafayette, LA (US); Randy M. Hoekstra, Richardson, TX (US); Joel J. Joseph, Jr., Lucas, TX (US); Richard A. Weiss, McKinney, TX (US); Susan M. King, San Jose, CA (US)

(73) Assignee: Nortel Networks LTD, Montreal (CA)

( * ) Notice: Subject to any disclaimer, the term of this patent is extended or adjusted under 35 U.S.C. 154(b) by 0 days.

(21) Appl. No.: 09/021,796

(22) Filed: Feb. 11, 1998

(51) Int. Cl.$^7$ .................................................. H04M 11/00
(52) U.S. Cl. .......................................... 379/88.15; 379/217
(58) Field of Search ........................ 379/67.1, 76, 88.15, 379/88.16, 88.23, 88.24, 88.25, 88.26, 217, 210, 211, 212; 455/31.1, 31.2, 31.3, 403, 414, 415, 417; 340/825.44

(56) References Cited

U.S. PATENT DOCUMENTS

| | | | |
|---|---|---|---|
| 5,140,626 | * | 8/1992 | Ory et al. ............................. 455/31.2 |
| 5,307,399 | * | 4/1994 | Dai et al. ............................. 455/31.3 |
| 5,311,570 | * | 5/1994 | Grimes et al. ......................... 455/417 |
| 5,329,578 | * | 7/1994 | Brennan et al. ................... 379/88.19 |
| 5,375,161 | * | 12/1994 | Fuller et al. .......................... 455/417 |
| 5,471,519 | * | 11/1995 | Howe et al. ........................ 379/88.26 |
| 5,559,859 | * | 9/1996 | Dai et al. ............................. 455/459 |
| 5,809,130 | * | 9/1998 | Ayala ..................................... 379/266 |
| 5,825,864 | * | 10/1998 | McGraw et al. ..................... 379/210 |
| 5,839,067 | * | 11/1998 | Jonsson ................................ 455/422 |
| 5,896,444 | * | 4/1999 | Perlman et al. ................... 379/93.35 |
| 5,933,488 | * | 8/1999 | Marcus et al. ....................... 379/217 |
| 5,950,128 | * | 9/1999 | Ghisler ................................. 455/426 |
| 6,016,336 | * | 1/2000 | Hanson ............................. 379/88.23 |
| 6,044,144 | * | 3/2000 | Becker et al. ....................... 379/265 |

\* cited by examiner

Primary Examiner—Fan Tsang
Assistant Examiner—Roland G. Foster
(74) Attorney, Agent, or Firm—Bruce E Garlius; Neil Mothew; James A. Harrison

(57) ABSTRACT

A call parking and paging system includes a call parking entity and a paging entity. The call parking entity receives a call and automatically parks the call, in some operations against a designated resource. The paging entity provides a page based upon an intended recipient of the call. Upon receiving a response to the page, the call parking and paging system may then assist in delivering the parked call. The call parking and paging system may be supported by a PBX, by a telephone system central exchange or by another communication system. Additional features may include a voice processing system, a validation entity, a directory system, a messaging system and an information database. Paging resources support voice pages, electronic pages and email that apprise the intended recipient of the parked call. The call parking and paging system may be accessed directly via a dialed number or from a call greeting system or may be invoked by an attendant or by a caller when attempted delivery to a particular extension fails. The validation entity may validate a request to issue a page and/or a request to receive a parked call. The call parking and paging system may direct pages intelligently by locating the intended recipient and then sending the page based upon a determined location. The call parking and paging system may deliver calls to designated parking extensions, ordinary extensions, a wireless phone or even a computer supporting voice communications. The call parking and paging system may also deliver the parked call to an alternative location or recipient, to the messaging system, to an attendant or to a call greeting system.

82 Claims, 13 Drawing Sheets

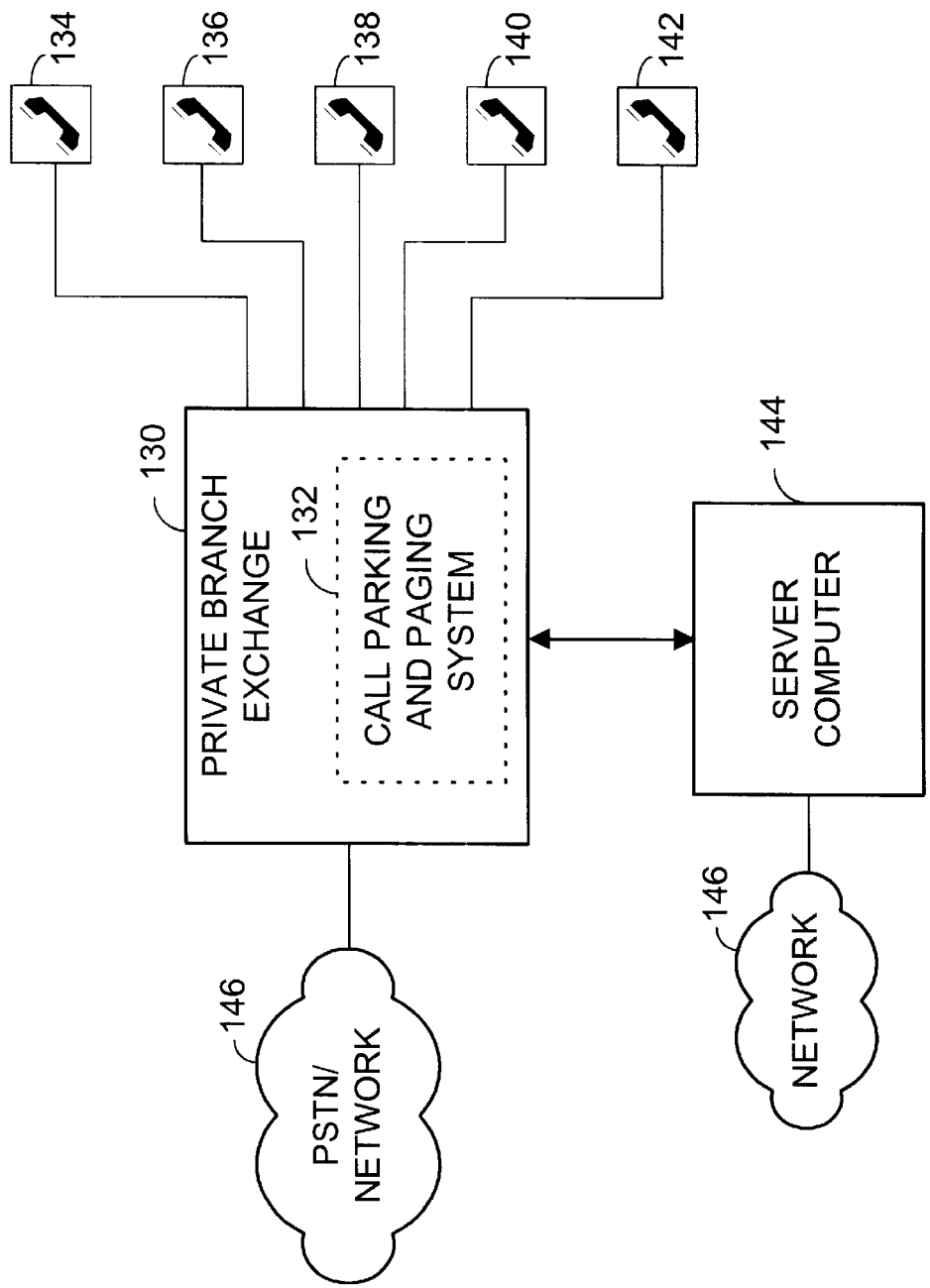

CALL PARKING AND PAGING SYSTEM AND METHOD OF OPERATION

BACKGROUND

1. Technical Field

The present invention relates generally to communication systems; and more particularly to a call parking and paging system that provides call parking and paging functions for, or in conjunction with, a communication system.

2. Related Art

Many enterprises and businesses use private branch exchanges (PBXs) to service a large portion of their communication needs. Facilities within which PBXs are used include hospitals, office complexes, corporate offices, factories, warehouses, sports arenas, schools, universities and other facilities that have a relatively large number of telephone extensions but do not require dedicated connections to the public switched telephone network (PSTN) for each extension. In a typical PBX installation, the PBX couples to the PSTN and to a plurality of extensions. The PBX routes calls between the connected extensions and routes calls between the PSTN and the connected extensions. The PBX may also provide extended functions such as a call greeting system, directory assistance, voice mail and call parking and paging functions.

Local service providers may provide PBX-like functions to serviced enterprises and businesses using central office hardware. The local service provider typically delivers equivalent functionality to the business or entity without requiring dedicated hardware at the business or entity site. Such service is attractive to those businesses and entities that desire the functions but cannot justify the purchase of a PBX due to a relatively low usage level.

In many organizations, a single phone number serves as the main number for the organization and most calls are received on the main number. When the main number is dialed, the call is routed to an attendant or to a call greeting system which provides the caller with a set of options, allowing the caller to reach a particular extension or a particular department, for example. With respect to the latter, after the caller selects an option, the call is processed according to the option selected. Should the caller request a selected extension, the call is delivered to the selected extension. Should the selected extension fail to pick up the call, the call is then returned to an attendant, to voice mail or to another destination, depending upon selection by the caller and/or default operations.

Irrespective of how a call is initially routed or returned, most organizations have at least one option in which a call is routed or returned to an attendant, primarily for further action. Each attendant is typically allocated a plurality of extensions with which to service calls. In many organizations, even with a large number of extensions allocated to the attendant, the attendant's extensions often become overloaded. Thus, when a call passes to the attendant and the attendant's extensions are all in use, the caller receives a busy signal.

When call parking and paging functions are requested, an attendant must first receive the call and then initiate the call parking and paging functions. Upon receipt of the call, the attendant receives information from the caller, parks the call against one of his or her extensions and announces the call over a public address system. Upon hearing the announcement, the desired party then dials the extension against which the call has been parked and receives the parked call. While call parking aids in delivering calls to a desired party, each parked call consumes one of the attendants. Further, when the attendant is busy, call parking tasks may overload the attendant, causing the attendant to be delinquent in servicing other calls.

In many organizations, delivering parked calls to the correct party is of heightened importance. For example, when an organization requires that the identity of a caller only be revealed to the desired party, call parking systems may breach confidentiality requirements by allowing anyone to pick up the parked call.

Additional difficulties relate to delivering calls which have been parked. Oftentimes, the attendant does not know whether the desired party is within the boundaries of the served facility. If the desired party is not present, calls are parked that cannot be delivered and resources are needlessly consumed in attempting to deliver the parked call. In such case, the caller receives a poor impression of the organization since the attendant appears to have no knowledge of the presence of the desired party.

Thus, there is a need in the art for a call parking and paging system that does not overload existing resources, that provides automatic call parking and paging functions to reduce attendant loading, that efficiently pages intended recipients and that minimizes erroneous routing of parked calls.

SUMMARY OF THE INVENTION

A call parking and paging system constructed according to the present invention overcomes the shortcomings of the prior systems, among other shortcomings. It includes a call parking entity and a paging entity. The call parking entity receives a call and automatically parks the call. The paging entity provides a page based upon an intended recipient of the call. Upon receiving a response to the page, the call parking and paging system may then assist in delivering the parked call. In one implementation, the call parking entity parks the call against a designated resource. The call parking and paging system may be supported by a PBX, by a telephone system central exchange or by another communication system to provide the call parking and paging functions.

Additional components of the call parking and paging system may include a directory system, a voice processing system, a validation entity and a messaging system. Paging resources may also be included which support various paging types, including voice pages, electronic pages via paging units and email, among others, each of which apprise the intended recipient that he or she has a parked call. Still other components that may be included with the call parking and paging system include a security system, a location information system and an interface to a wireless communication system. The wireless communication system may be used not only in accomplishing the call parking and paging operations, but for call delivery functions as well.

The call parking and paging system may be accessed by various operations. In one operation, the call parking and paging system is accessed directly via a dialed number. In another operation, a user invokes operation of the call parking and paging system from a call greeting system. In still another operation, an attendant invokes operation of the call parking and paging system. In yet another operation, the call parking and paging system is invoked when attempted delivery to a particular extension fails.

By automatically parking calls and generating pages based upon the intended recipient, the call parking and paging system relieves the attendant from the burden of parking calls and generating pages. Further, because the calls may be parked against designated resources, the attendant's extensions are not consumed by parked calls. The designated resources may include, for example, resources to which delivery of the call was attempted and/or a plurality of designated parking extensions.

The optional directory system may be used by the caller to identify an intended recipient. Interaction with the caller may be performed using the optional voice processing system to allow the caller to identify an intended recipient by voice input alone and/or by other techniques such as keypad entry. The voice processing system may request the caller to speak the name of a desired intended recipient. The voice processing system then may process the response to select an entry from the directory system to identify the intended recipient. In another operation, the voice processing system simply receives the spoken name of the intended recipient and the call parking and paging system uses the spoken name in the page.

The validation entity may be used to validate a request to issue a page and/or to validate a request to receive a parked call. The validation entity may work in conjunction with the voice processing system, employing speaker verification and/or speaker identification as a part of the validation process. Standard validation techniques such as password entry may also be used by the validation entity.

The call parking and paging system of the present invention may operate to direct pages intelligently. In one operation, the call parking and paging system interacts with a security system via a server computer to determine the location of an intended recipient within a particular area and directs the page to the particular area. In another operation, the call parking and paging system accesses an information data base to determine a most likely location of an intended recipient and directs the page appropriately. In yet another operation, the location of the intended recipient is determined by accessing a premises based wireless network which indicates the location of the intended recipient within a served area. Based upon the location information retrieved, the page is issued in one or more paging areas corresponding to the current location of the intended recipient.

The call parking and paging system may deliver calls in a variety of fashions. When the call has been parked, a page has issued and a response has been received, the call parking and paging system may deliver the parked call to the location from which the request is received. The request may be made from a designated parking extension, an ordinary extension, a wireless phone or even a computer supporting voice communications. The call parking and paging system may also deliver the parked call to an alternative location or recipient, to the messaging system, to an attendant or to the call greeting system.

These and other aspects of the present invention will become apparent with further reference to the drawings and the detailed description which follow.

BRIEF DESCRIPTION OF THE DRAWINGS

FIG. 1C is a diagram illustrating an alternative installation of the call parking and paging system with a Private Branch Exchange (PBX);

DETAILED DESCRIPTION OF THE DRAWINGS

Figure 1A:
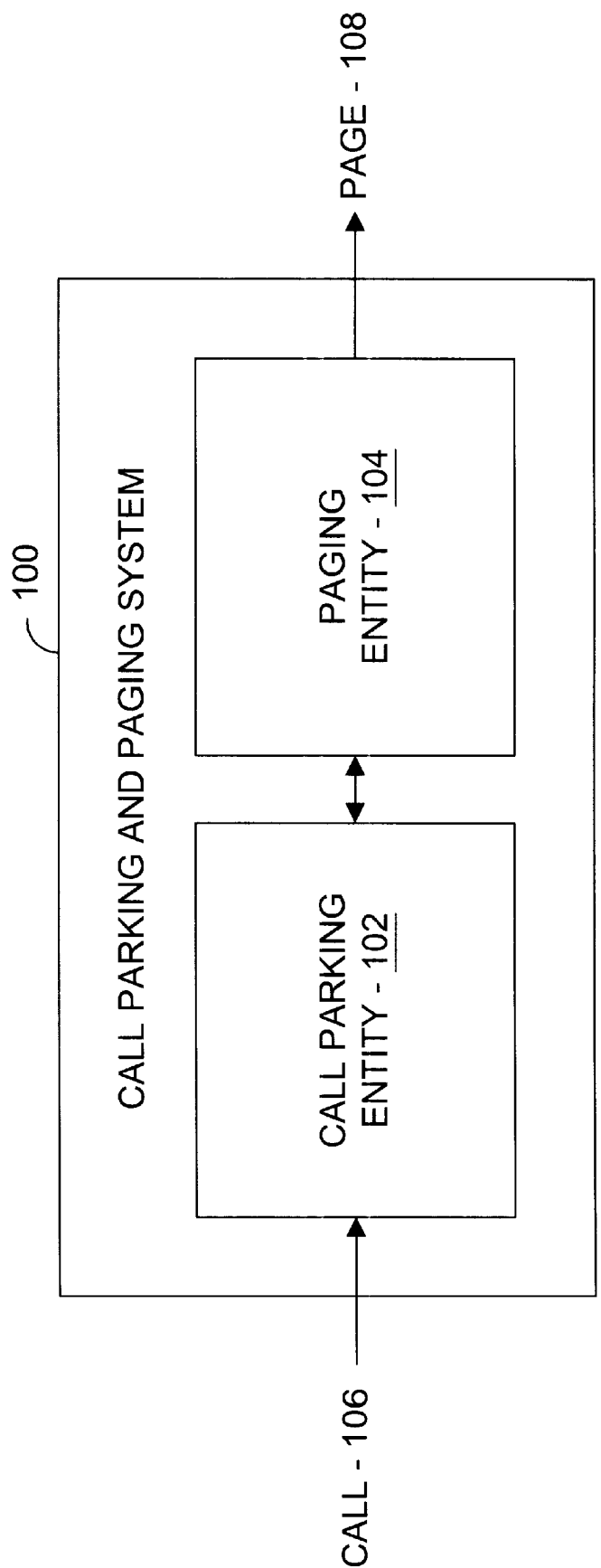
FIG. 1A is a block diagram illustrating a call parking and paging system constructed according to the present invention.

FIG. 1A illustrates a call parking and paging system 100 constructed according to the present invention. The call parking and paging system 100 includes a call parking entity 102 and a paging entity 104. The call parking entity 102 receives a call 106 and automatically parks the call against a designated resource. The paging entity 104 provides a page 108 based upon an intended recipient of the call 106. The page 108 may be a voice page, an email message, an electronic page or another type of page that notifies an intended recipient that he or she has a parked call.

The call parking and paging system 100 may receive the call 106 through various operations. In one operation, the call parking and paging system 100 is accessed directly by a caller using a direct dial number and the call 106 is delivered directly. In another operation, when a first intended recipient does not answer the call 106, the caller directs the call 106 to the call parking and paging system 100. In still another operation, the caller directs the call 106 to the call parking and paging system 100 from a call greeting system. In yet another operation, an attendant directs the call 106 to the call parking and paging system 100. The call parking and paging system 100 may be accessed in other fashions as well since the call parking and paging system 100 may be accessed using a direct dial number or extension number. Upon receiving a call the call parking and paging system 100 parks the call against a designated resource. The designated resource may be an extension previously dialed or one of a plurality of dedicated parking extensions.

The intended recipient may be an individual, a group of individuals, an organizational unit such as a department, a particular type of person (e.g., technical consultant, sales person, security person, etc.), a person or group of persons supporting particular language requirements (e.g. French, German, Spanish, etc.) or a particular physical location, for example. Should the call 106 have been originally intended for delivery to a particular extension, the paging entity 104 may determine the intended recipient based upon the originally intended extension. When the call parking and paging system 100 is directly invoked, the caller may select an intended recipient from a menu, a directory, by verbally identifying the intended recipient or by other options presented. When the call parking and paging system 100 is invoked by an attendant, the attendant may select the intended recipient based upon a request from the caller. However, as compared to prior devices, once the attendant selects the intended recipient, the paging entity 104 automatically issues the page to the intended recipient and the system 100 automatically routes the call without further action by the attendant.

The call parking and paging system 100 may reside within various types of communication systems, including the telephone system central exchange or the Private Branch Exchange (PBX) described hereinafter. However, the call parking and paging system 100 is not limited to any particular installation. Further, the call parking and paging system 100 may operate in conjunction with a communication systems but be separately implemented. Thus, applicability of the call parking and paging system 100 is not limited by the structures described herein.

Figure 1B:
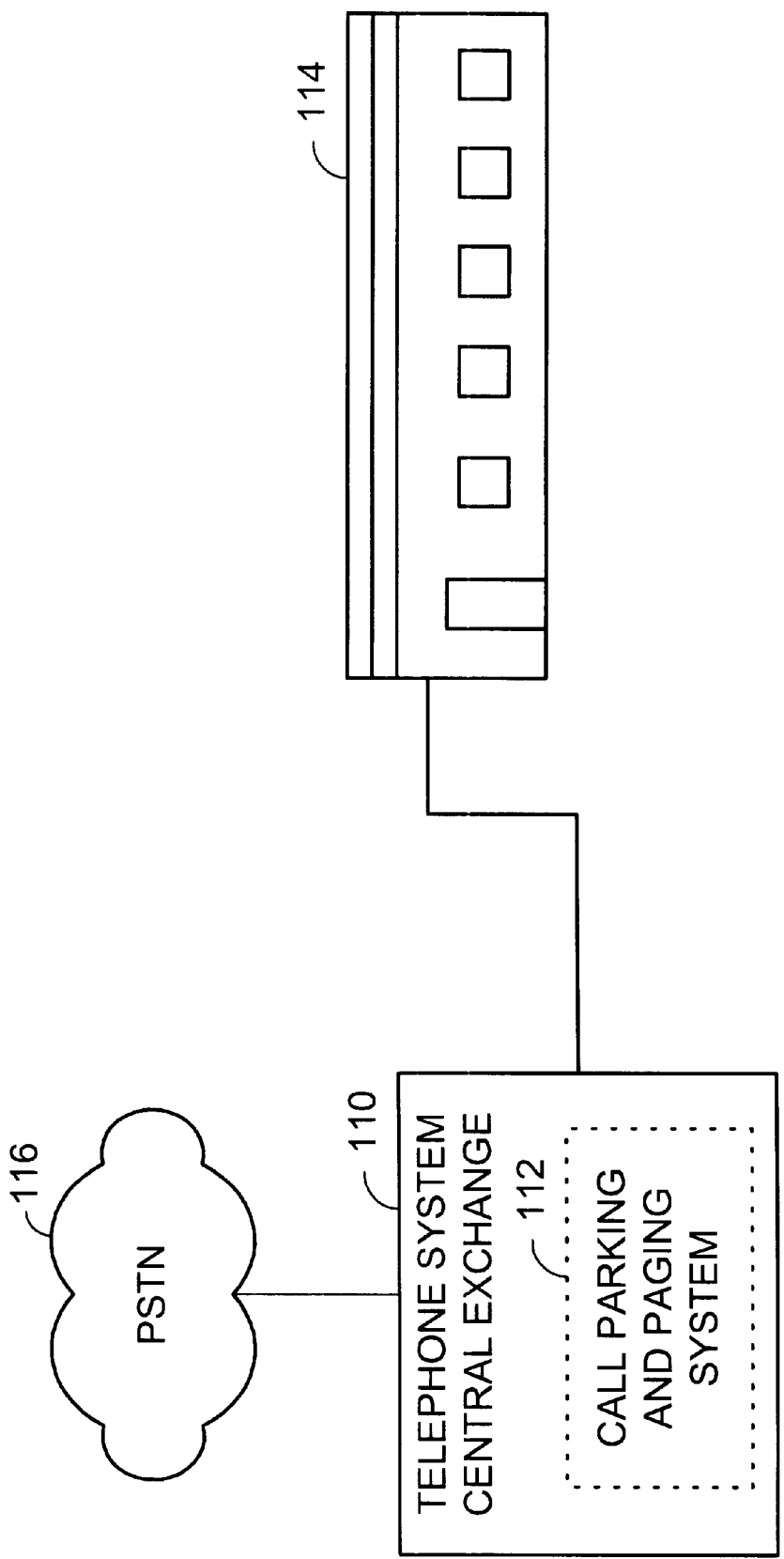
FIG. 1B is a diagram illustrating an installation of the call parking and paging system within a telephone system central exchange.

FIG. 1B illustrates the installation of a call parking and paging system 112 within a telephone system central exchange 110. The telephone system central exchange 110 couples to the Public Switched Telephone Network (PSTN) 116 and provides telephone services to a business 114. In the installation, the telephone system central exchange 110 provides at least call parking and paging functions to the business 114. However, in addition to the call parking and paging functions, the telephone system central exchange 110 may also provide additional communication functions for the business 114 such as supporting a plurality of extensions within the business 114 and providing call conferencing, call waiting, call forwarding and messaging functions, for example.

FIGURE 1C illustrates the installation of a call parking and paging system 132 within a PBX 130. The PBX 130 may be located within a business premises to provide communication functions for a plurality of extensions 134–142 within the business premises. The PBX 130 couples to the PSTN 146 and/or to another telephone network to service calls between the plurality of extensions 134–142 and the PSTN 146 and/or the other telephone network. The PBX 130 also couples to a server computer 144 that provides support functions and additional communication functions. The server computer 144 couples to a network 146 which may provide the server computer 144 access to the Internet, to an intranet, to a wireless network, to a LAN or to another network. The PBX 130 may route communications through the server computer 144. An example of such an operation may be the routing of an Voice Over Internet Protocol (VOIP) call between one of the extensions 134–142 and a remotely located telephone coupled to the Internet via a VOIP service provider.

Figure 1D:
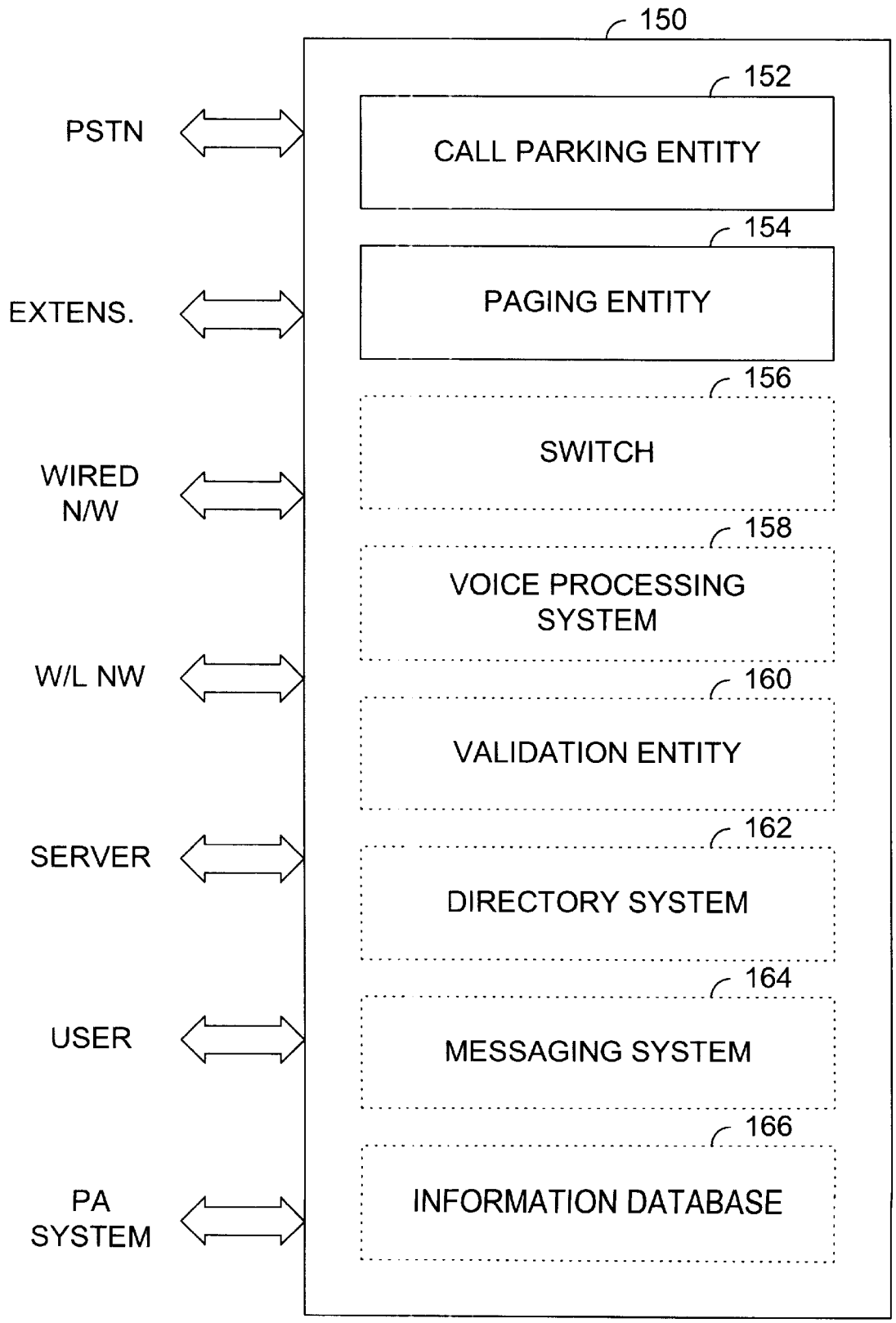
FIG. 1D is a block diagram illustrating an alternative construction of a call parking and paging system constructed according to the present invention in which optional components provide functions complementing the call parking and paging functions.

FIGURE 1D illustrates generally a call parking and paging system 150 constructed according to the present invention that includes components in addition to those previously described. These additional components may be those that are included in a PBX or other telephone switch. As shown, the call parking and paging system 150 includes a call parking entity 152 and a paging entity 154, the construction and operation each of which were discussed with respect to FIG. 1A as elements 102 and 104, respectively. The call parking and paging system 150 also includes an optional switch 156, an optional voice processing system 158, an optional validation entity 160, an optional directory system 162, an optional messaging system 164 and an optional information database 166. In addition to coupling to the PSTN and to the plurality of extensions, the call parking and paging system 150 may also couple to a wired network, a wireless network, a server computer, a user input/output link and to a public address system.

The switch 156 performs call switching functions for the call parking and paging system 150 and may service calls among a plurality of extensions and between the plurality of extensions and the PSTN. The voice processing system 158 performs speaker verification and/or identification functions based upon a received voice sample, which may include a voice sample that is used in a voice page. The validation entity 160 performs validation functions in determining whether a particular caller may issue a page and/or in determining whether a party requesting to receive a parked call may receive the parked call. The voice processing system 158 may operate in conjunction with the validation entity 160 to perform the validation. The directory system 162 provides directory functions to a caller, allowing a caller to select an intended recipient for a call and/or to select options for further call processing. The voice processing system 158 may also work in conjunction with the directory system 162 to retrieve directory entries. The messaging system 164 allows a caller to leave a message for an intended recipient should the caller be unable to reach the intended recipient. Finally, the information database 166 stores information relating to the location of an of intended recipient, such location information used in directing pages and in delivering parked calls.

The call parking and paging system 150 may connect to a server computer, e.g. a standard digital computer. Interaction with the server computer enhances operation of some of the functions provided by the call parking and paging system 150. In one particular example that will be further described herein with respect to FIG. 7, the server computer provides security system functions for a premises in which the call parking and paging system 150 is installed. The call parking and paging system 150 accesses the security system functions when determining whether and where to issue voice pages and/or in determining whether and where to forward a call. Because construction and operation of digital computers is generally known, the server computer will not be further described herein except as to expand upon the concepts of the present invention.

The call parking and paging system 150 may also couple to a wired and/or wireless networks. Each of these networks may used to deliver pages and/or to deliver calls. For example the wireless network may be used to deliver an electronic page to indicate to an intended recipient that he or she has a parked call waiting. Likewise, the wired network may be used to deliver email or another message to indicate to an intended recipient that he or she has a parked call waiting. The networks may also be employed to deliver the call itself. For example, the call parking and paging system 150 may determine that an intended recipient has his or her proximity phone (such as the Nortel Companion Phone) or cellular phone currently operating and available for call receipt. Upon such a determination, the call parking and paging system 150 delivers the call via the wireless network to the appropriate destination. The wireless and wired networks may also be employed by the messaging system 164 to deliver messages left by a caller.

A user may access the call parking and paging system 150 to manage the system. Alternatively, management of the call parking and paging system 150 may be performed via the server computer. The call parking and paging system 150 accesses the public address system to issue a voice page to an intended recipient.

Figure 2A:
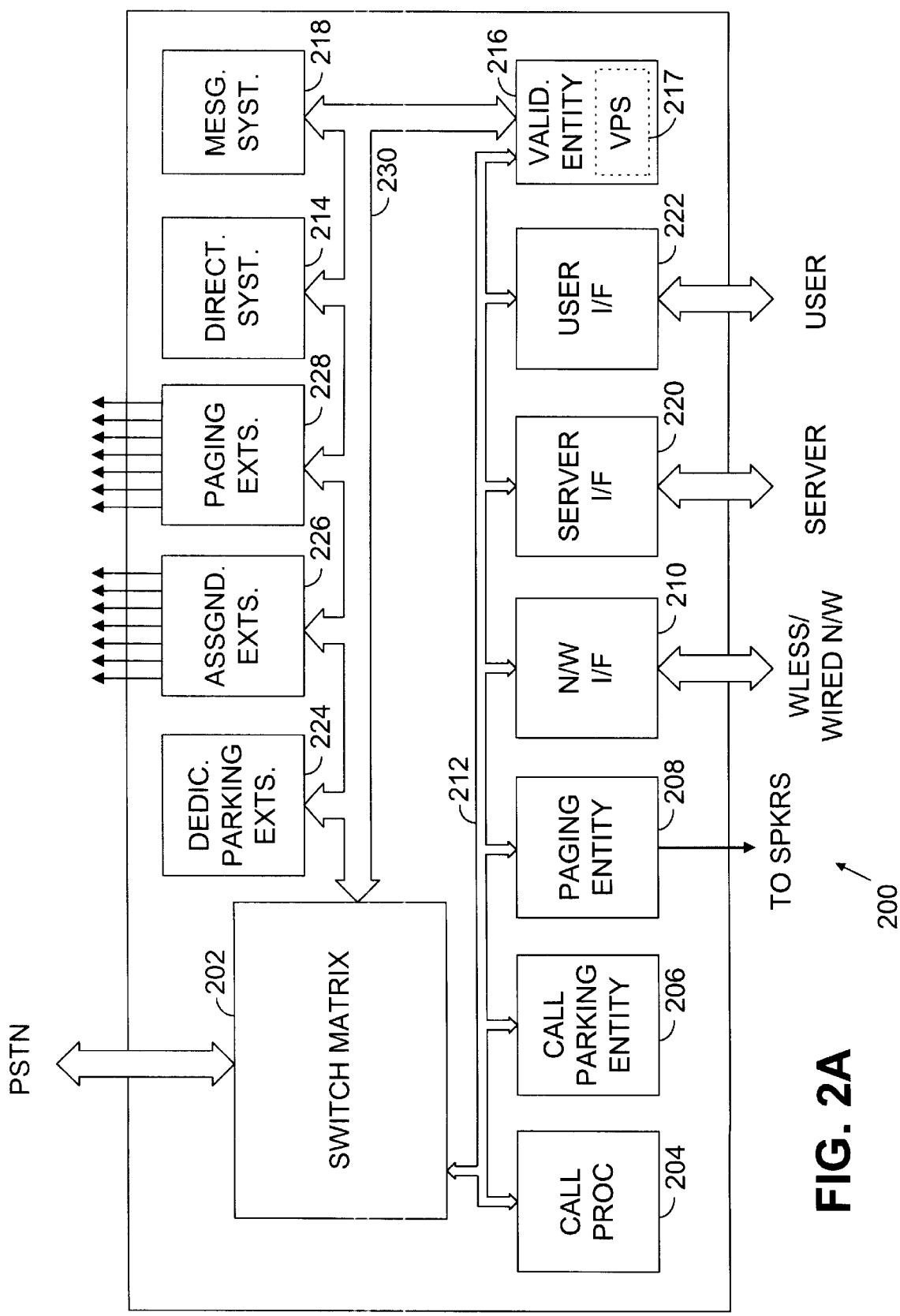
FIG. 2A is a block diagram illustrating a telephone switch within which a call parking and paging system constructed according to the present invention resides.

FIG. 2A illustrates a telephone switch 200 having a call parking and paging system according to the present invention installed therein. The telephone switch 200 includes a switch matrix 202, a call processor 204, a call parking entity 206 and a paging entity 208. The telephone switch 200 also includes a directory system 214, a validation entity 216 (which includes a voice processing system 217) and a messaging system 218. Further, the telephone switch 200 includes a server interface 220, a user interface 222 and a network interface 210. Finally, the telephone switch 200 includes a dedicated parking extension unit 224, an assigned extensions interface 226 and a paging extensions interface 228. The telephone switch 200 may be a PBX or form a portion of a telephone system central exchange.

The switch matrix 202 couples to the PSTN (or to another telephone network) and switches calls not only between the PSTN and extensions served by the telephone switch 200 but between extensions served by the telephone switch 200. The lines coupled to the switch matrix 202 are each assigned a unique phone number. However, the switch matrix 202 may assign some of the incoming lines to a general calling number and other of the incoming lines to individual assigned extensions. Incoming calls on lines assigned to the individual extensions may be routed directly to the assigned extension interface 226 upon receipt. However, calls incoming calls on lines assigned to the general calling number are either routed to an attendant or to a call greeting system supported by the telephone switch 202.

The call processor 204 couples to a control bus 212 and generally controls operation of the switch matrix 202. The control bus 212 also couples to the call parking entity 206, the paging entity 208, the network interface 222, the server computer and user interface 220 and the validation entity 216. The call processor 204 provides supervisory and control functions within the telephone switch, overseeing operation of all other devices within the telephone switch. Operation and construction of call processors is generally known and will not be further described herein except as to expand upon the principles of the present invention.

Calls may be routed to the dedicated parking extensions via the dedicated parking extension interface 224 over bus 230, to assigned extensions via the assigned extensions interface 226 and to paging extensions via the paging extension interface 228. As is shown, bus 230 interconnects the interfaces 224, 226 and 228 as well as the directory system 214, the validation entity 216 and the messaging entity 218 to the switch matrix 202. The bus 230 may comply with any various proprietary or open standard that is consistent with operation of the telephone switch 200.

The dedicated parking extension interface 224 does not physically connect to any extensions but simply provides the switch matrix 202 with connections against which the switch matrix 202 parks calls. However, in other embodiments, the switch matrix 202 may logically connect parked calls to designated parking extensions without requiring use of the dedicated parking extension interface 224. The ability to create such logical extensions depends upon the operating capabilities of the telephone switch 200.

When the telephone switch 200 receives a call, the call processor 204 determines the dialed number for the call. If the dialed number corresponds to an assigned extension, the call processor routes the call through the switch matrix 202 and the bus 230 to a corresponding assigned extension via the assigned extension interface 226. Should the corresponding assigned extension not pick-up the call, the call processor 204 determines an alternate routing for the call. Should the alternate routing be to park the call, the call parking entity 206 and the call processor 204 interact to either park the call against the dialed extension or against one of the dedicated parking extensions via the dedicated parking extension interface 224. The paging entity 208 then operates to provide a page respective to an intended recipient. In another operation, the call parking entity 206 is accessed via direct dialing. In still another operation, the call parking entity 206 is accessed from a call greeting system.

Figure 2B:
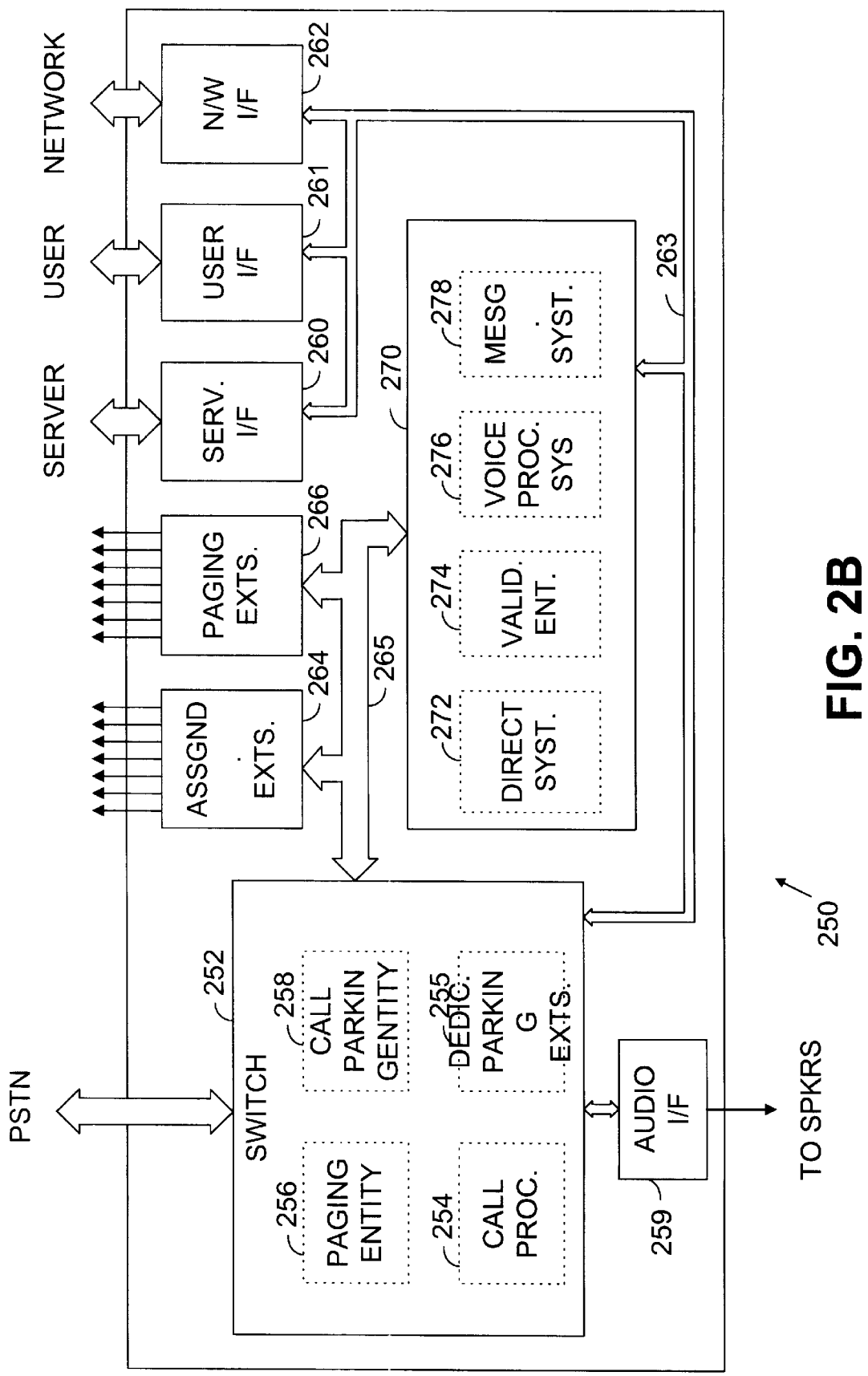
FIG. 2B is a block diagram illustrating an alternate construction of a telephone switch within which a call parking and paging system constructed according to the present invention resides.

FIG. 2B illustrates an alternate embodiment of a telephone switch 250 constructed according to the present invention. As shown, the structure of the telephone switch 250 varies as compared to the telephone switch 200 of FIG. 2A. The call processor 254, the paging entity 256 the call parking entity 258 and dedicated parking extensions 255 are contained within a switch 252. While the functions provided by the paging entity 256 and the call parking entity 258 are similar, they are accomplished via specialized programming of the switch 252. Further, the dedicated parking extensions 255 are logical extensions within the switch having no physical counterpart.

The directory system 272, the validation entity 274, the voice processing system 276 and the messaging system 278 are contained within an extended services unit 270 that has a single interface to bus 265. The assigned extensions interface 264 and the paging extensions interface 266 couple to the switch 252 via the bus 265. Further, a server interface 260, a user interface 261 and a network interface 262 couple to the switch 252 via bus 263. As will be appreciated by one skilled in the art, various other constructions for the telephone switch are also possible to accomplish the teachings of the present invention.

FIGS. 2A and 2B illustrate hardware components that execute software instructions. These hardware components may be generally constructed or may be specifically constructed for the applications described. In any case, the hardware components will receive and store the software instructions and execute the software instructions in a manner generally known in the art.

Figure 3:
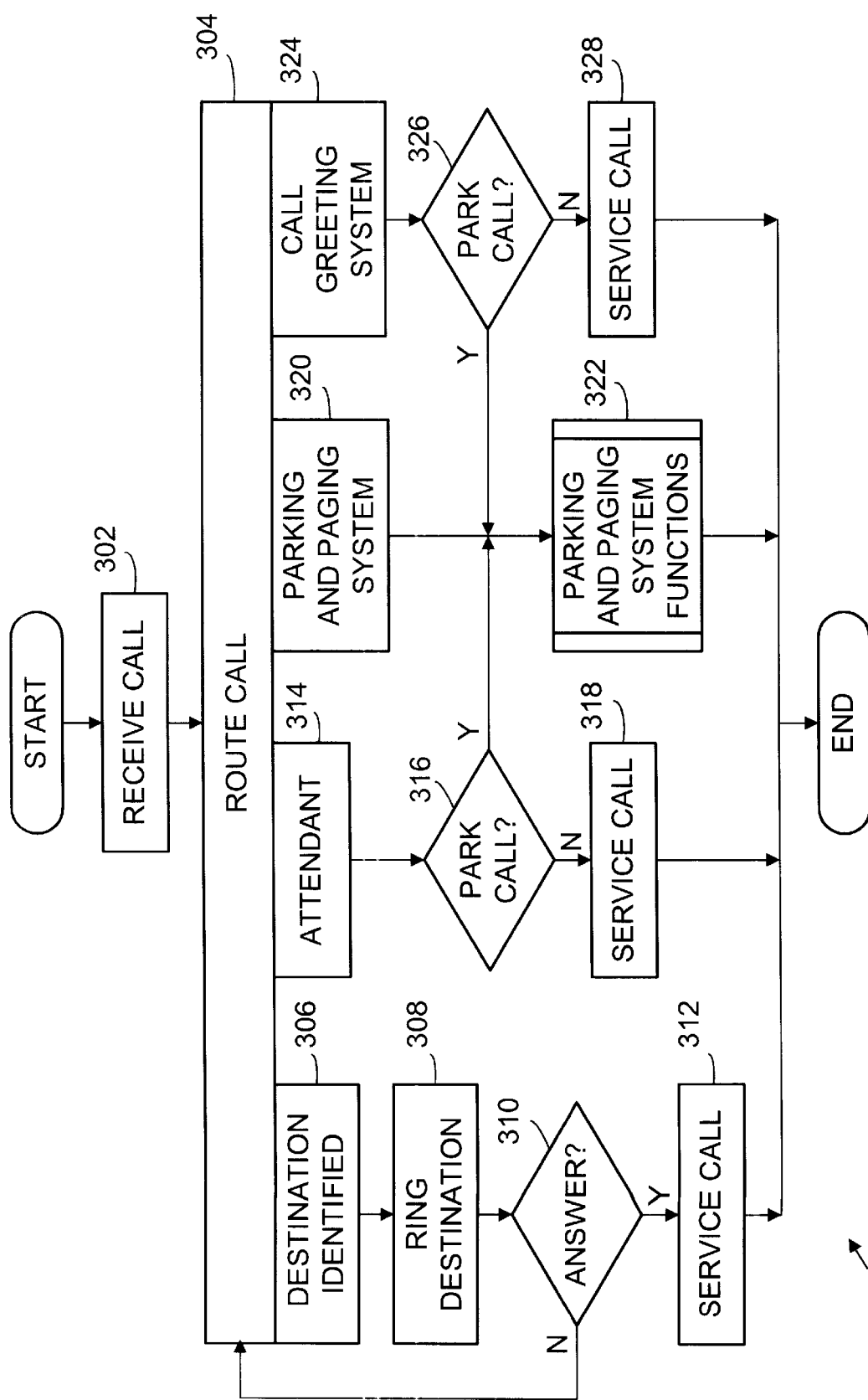
FIG. 3 is a block diagram illustrating operation of a telephone switch which includes a call parking and paging system constructed according to the present invention in receiving calls, parking calls, servicing parked calls and delivering parked calls.

FIG. 3 illustrates operation 300 of a call parking and paging system constructed according to the present invention in conjunction with a telephone switch such as a central office telephone switch or a PBX. Operation 300 commences at step 302 wherein a telephone switch receives a call. Based upon the dialed number corresponding to the call, the telephone switch routes the call at step 304. If the dialed number corresponds to the call parking and paging system at step 320, operation proceeds to step 322 in which call parking and paging operations are invoked via the call parking and paging system. Subsequent to the operations of the call parking and paging system at step 322, operation ends.

If the dialed number corresponds to a particular extension serviced by the telephone switch at step 306, operation proceeds to step 308 wherein the telephone switch rings an extension corresponding to the dialed number. If the destination extension answers the call at step 310, the call is serviced at step 312. Once servicing of the call is complete at step 312, operation ends. If no answer is received at step 310, operation returns to step 304.

If the dialed number corresponds to an attendant at step 314, the attendant receives the call and provides options to the user. One such option provided is to initiate the call parking and paging system at step 316. Should the call parking and paging system be initiated at step 316, operation proceeds to step 322 wherein operations provided by the call parking and paging system are performed. However, if parking and paging operations are not selected at step 316, operation proceeds to step 318 where the call is otherwise serviced. Once servicing of the call is complete at step 318, operation ends.

If the dialed number corresponds to the call greeting system at step 324, the call greeting system initially services the call. One option provided by the call greeting system is to initiate the call parking and paging operations at step 326. Should call parking and paging operations be initiated at step 326, operation proceeds to step 322 where such operations are performed. However, if call parking and paging operations are not selected at step 326, operation proceeds to step 328 where the call is otherwise serviced. Once servicing of the call is complete at step 328, operation ends.

Figure 4A:
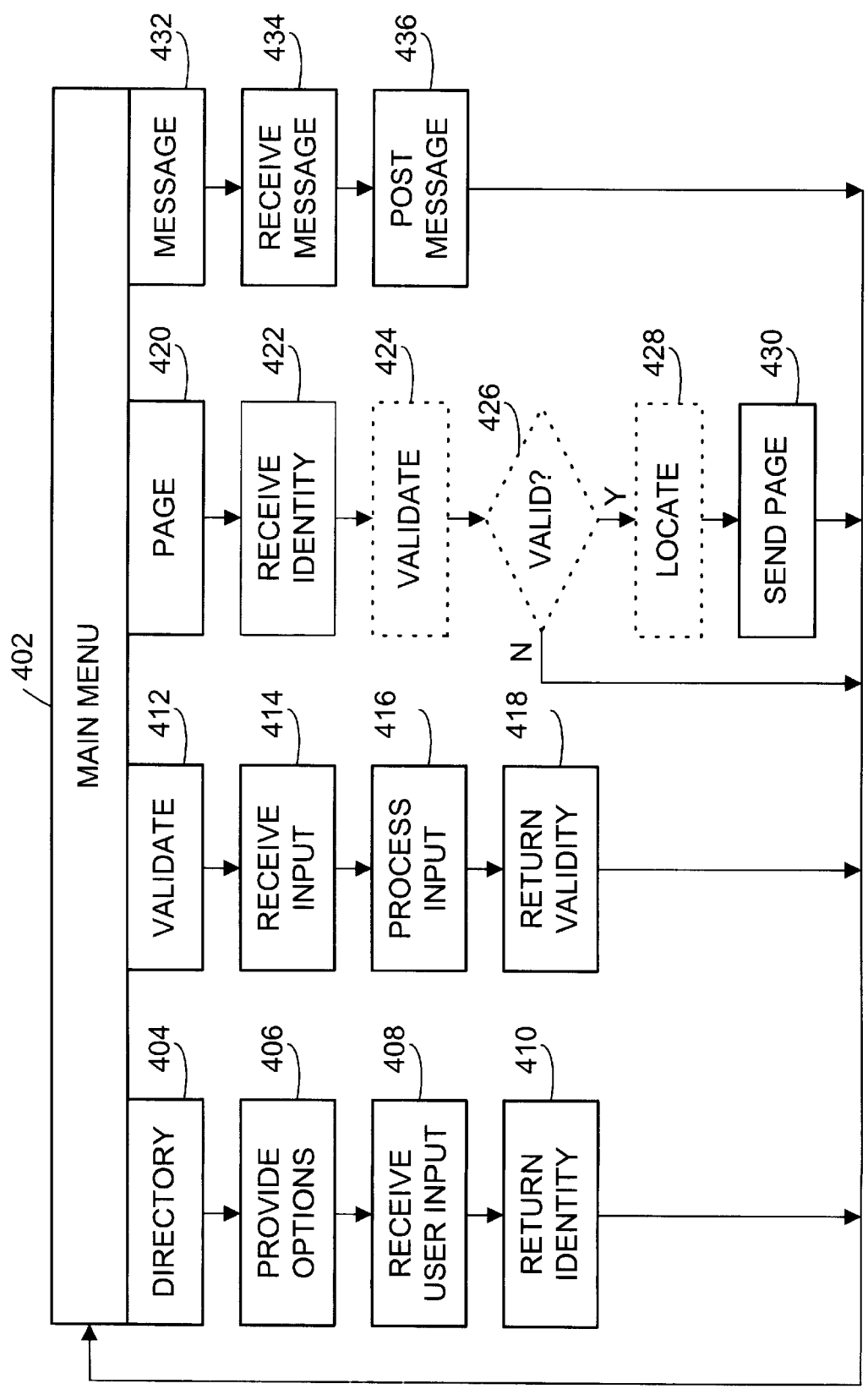
FIGS. 4A and 4B are logic diagrams illustrating operation of a call parking and paging system constructed according to the present invention.
Figure 4B:
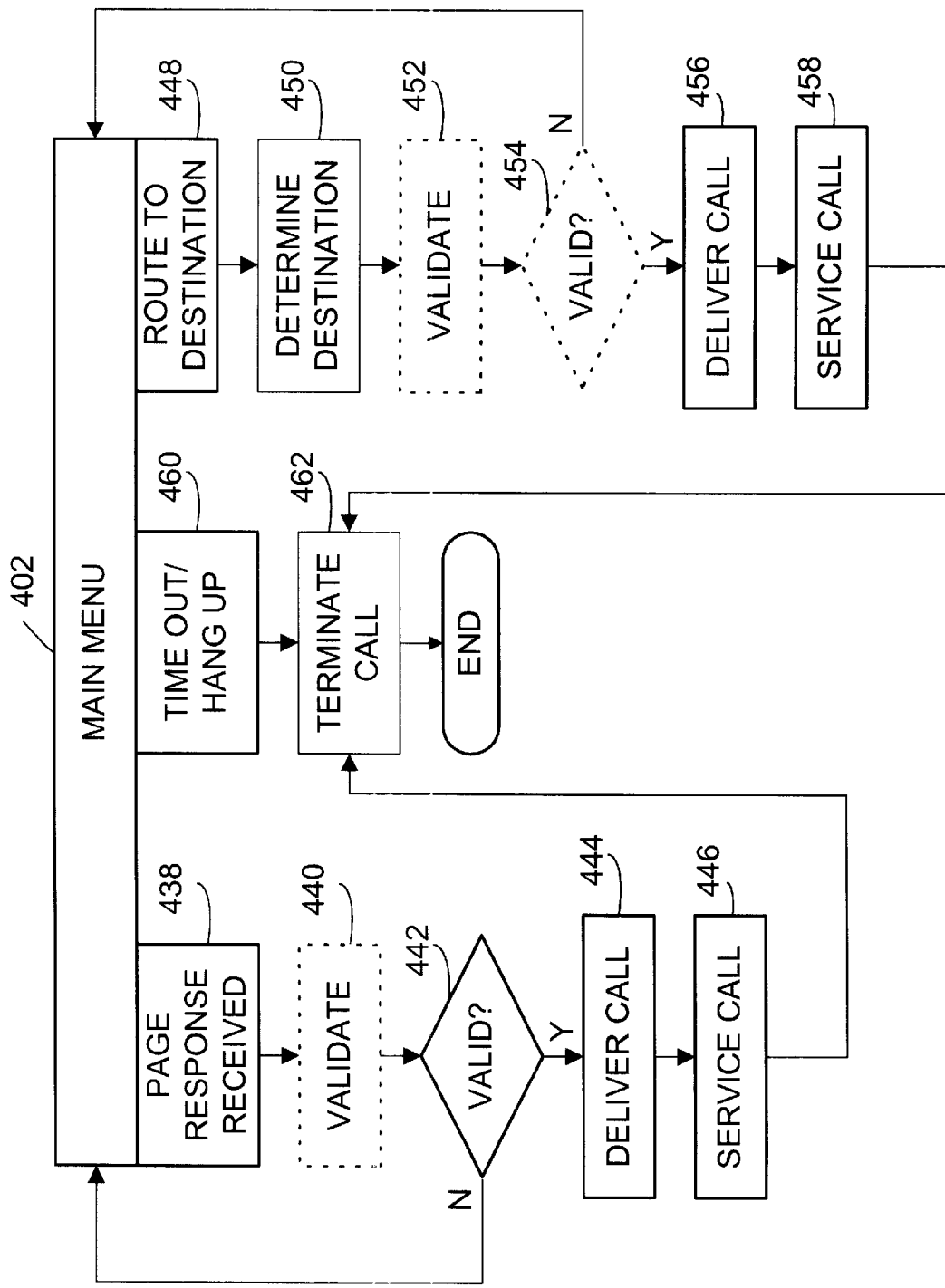

FIGS. 4A and 4B illustrate operation of a call parking and paging system constructed according to the present invention in servicing a call upon receipt at step 322 of FIG. 3. Operation commences at a main menu at step 402 where the caller is presented a number of options. From the main menu at step 402, a caller may invoke directory system functions at step 404, validation functions at step 412, paging functions at step 420, messaging functions at step 432 and destination delivery functions at step 448. Further, the call parking and paging system may automatically invoke time-out functions at step 460 and page response functions at step 438 as well as automatically invoking the directory functions at step 404 and the validation functions at step 412.

Referring now to FIG. 4A, when the directory functions are invoked at step 404, the call parking and paging system provides the caller with options at step 406. Such options may be to input the first few letters of a desired recipient's name, to speak the desired recipient's name and/or to request recitation of the names of desired recipients from a list. The call parking and paging system then receives input from the user at step 408. Based upon the received input, the call parking and paging system identifies an intended recipient at step 410. Interactive Voice Response (IVR) may be used at steps 408 and 410 to allow the caller to identify the intended recipient. The IVR technique may allow the user to select from a directory of possible intended recipients. Further, the voice processing system may be employed at step 410 to determine the intended recipient based upon a spoken name of the intended recipient provided by the caller. Techniques employed to access a directory based upon spoken input using a voice processing system are generally known in the art. Once the intended recipient has been determined, operation proceeds to step 402.

When validation functions are executed at step 412, operation proceeds to step 414 wherein input is received. The input received at step 414 may be in the form of a password, voice input or other indication of the validity of the caller or party requesting to receive a parked call. As was previously alluded to, in some operations, it is desirable to validate the caller prior to issuing a page. For example, limitations are often placed on reaching an intended recipient, such as when attempting to reach a medical doctor performing rounds in a hospital. Thus, prior to issuing a voice page to the intended recipient, operation may require that the caller have permission to issue the page. Further, in other operations, it is desirable to validate a party requesting to receive a parked call prior to delivery of the parked call. Both of these validation operations commence at step 412 and proceeds to step 414.

From step 414 where the input is received, operation proceeds to step 416 wherein the received input is processed to determine its validity. In determining validity, IVR may be used to receive input from a telephone at step 414 and the input validated against a reference password. Further, speaker verification and/or speaker identification functions may be used to validate the identity of the caller in conjunction with the voice processing system. Moreover, a caller line identification (CLID) of the caller and/or a CLID of the extension from which delivery is requested may also be used for validation. Each of these techniques is generally known in the art. Once the input has been processed to determine validity at step 416, the validity determination is returned at step 418. From step 418, operation proceeds again to the main menu at step 402 or to an operation which called the validation process.

Initiation of the issuance of a page commences at step 420 and proceeds to step 422 wherein the identification of the intended recipient is determined. In identifying the intended recipient, the call parking and paging system may automatically execute steps 404 through 410 to identify the intended recipient. However, the call parking and paging entity may simply request the caller to speak the name, department or other identifier and, use the spoken information within the page. In this operation, the directory operations of steps 404 through 410 are not performed.

Next, at optional steps 424 and 426, validation of the caller may be performed prior to issuing the page. In such a case, steps 412 through 418 would be executed. Should the request prove valid at step 426, operation proceeds to optional step 428 wherein the location of the identified party is optionally determined. As will be more fully described with reference to FIGS. 5 through 8, the location of an identified party may be roughly determined so that the page is properly directed within a large facility, for example. If the location operation of step 428 is not executed, operation proceeds directly from step 426 to step 430. If neither validation operations nor location operations are required, operation proceeds directly from step 422 to step 430. The page is sent at step 430. From step 430, operation proceeds to the main menu at step 402. Further, if the request was not valid at step 426, operation also proceeds to the main menu at step 402.

The caller may also elect to leave a message at step 432 with the messaging system. If the user chooses to leave a message, operation proceeds to step 434 wherein the call parking and paging system receives the message from the caller and then to step 436 wherein the call parking and paging system posts the message to the messaging system.

Referring now to FIG. 4B, the caller may also route the call to a destination by executing operation at step 448. From step 448, operation proceeds to step 450 wherein the alternate destination is determined. The destination may be determined via the directory functions of steps 404 through 410 or by the caller entering another extension number. After determining the destination, operation proceeds to optional validation step 452 to determine whether the caller has rights to route the call to the destination. Operation at step 452 may correspond to steps 412 through 418 of FIG. 4A. If the caller does not have rights to deliver the call to the requested destination, as determined at step 454, operation returns to the main menu at step 402. However, if the caller does have rights to deliver the call to the requested destination, as determined at step 454, operation proceeds to step 456 wherein the call is delivered and then to step 458 where the call is serviced. Once servicing is complete, operation proceeds to step 462. Should validation not be required, operation proceeds directly from step 450 to step 456.

Operation automatically proceeds from the main menu at step 402 to step 438 when a response is received to a page at step 438. The response is then optionally validated at step 440. If the response is determined to be valid at step 442, operation proceeds to step 444 wherein the parked call is delivered, and then onto step 446 where the call is serviced. From step 446 operation proceeds to step 462. If the response is not valid at step 442, operation proceeds to the main menu at step 402.

The call parking and paging system may also determine that a time-out period has expired or when the caller hangs up at step 460. When the caller hangs up, the call is terminated at step 462 and then operation ends. When a time-out occurs, the call parking and paging system may provide the caller with an exit message indicating that the intended recipient is not available and to please call again later. Alternatively, the call parking and paging system may reroute the call to the attendant at step 314, the directory at step 404 or the messaging system at step 432.

Figure 5:
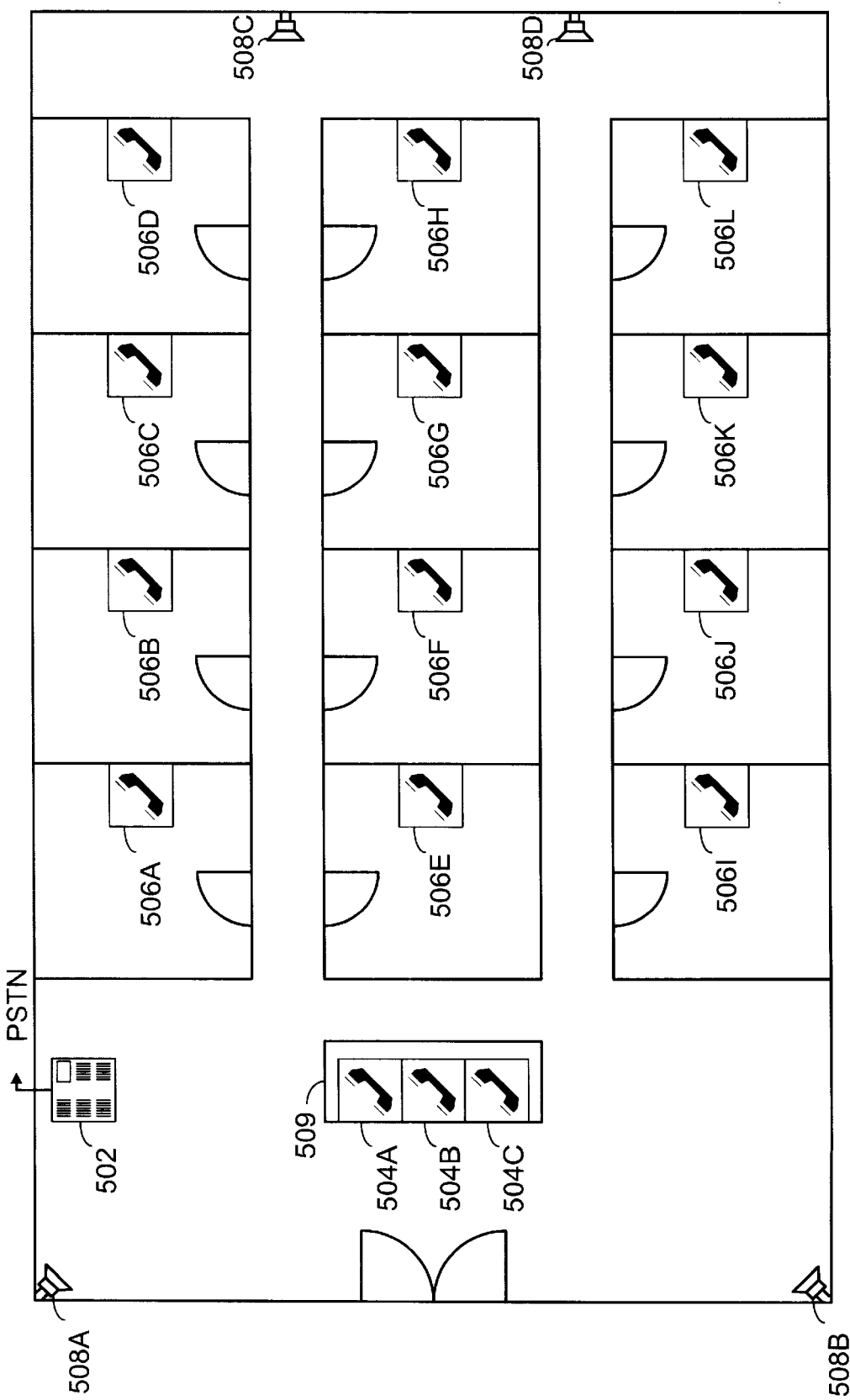
FIG. 5 is a diagram illustrating an office building premises serviced by a call parking and paging system constructed according to the present invention.

FIG. 5 illustrates an installation 500 of a call parking and paging system constructed according to the present invention contained within a PBX 502. As is shown, the installation 500 is within an office building having a plurality of offices, an entrance area and an attendant station 509. In the particular installation shown, the attendant station 509 has three dedicated extensions 504A, 504B and 504C, each of which connects to the call parking and paging system 502. Further, each office includes at least one extension, 506A–506L, each extension connecting to PBX 502. The PBX 502 routes calls among the extensions 506A–506L and 504A–504C and also routes calls between the extensions and the PSTN which connects to the call parking and paging system 502. The installation 500 also includes a public address system including a plurality of loudspeakers 508A–508D coupled to the call parking and paging system for use in sending voice pages. While the call parking and paging system is supported by the PBX 502, equivalent services could be provided by a telephone local service company using resources located at the telephone system central exchange.

Calls are received by the call parking and paging system from the PSTN or from one of the extensions 504A–504C and 506A–506L and intended for an intended recipient. As was previously discussed, calls reach the call parking and paging system via a particular dialed number, when a dialed extension fails to pick up, from an attendant, from a call greeting system or when otherwise directed thereto. Upon receipt, the call parking entity parks the call against an allocated resource. Should the call be first directed to an extension, for example extension 506L, the call may be parked against extension 506L by the parking entity. Should the call be received by the call parking entity from the general greeting system or from the attendant, the call may be parked against one of a plurality of designated resource extensions. Thus, in either case, the call is not parked against one of the attendant's extensions 504A–504C, preventing the attendant's extensions 504A–504C from being consumed by parked calls.

In an example of operation, an incoming call to the PBX 502 from the PSTN is intended for extension 506L. The PBX 502 routes the call to extension 506L and provides a ringing signal at the extension 506L. However, the resident of the corresponding office is not present and, resultantly, does not pick-up the call. After a time out period, the PBX 502 determines that the call has not been picked up by the selected extension 506L and provides the caller with a menu that provides the options of: (1) press '1' to leave voice mail for the called party; (2) press '2' to page the called party; and (3) press '0' to reach an attendant.

If the caller presses '2', the call is routed to the call parking and paging system. Upon receipt, the call parking and paging system parks the call and determines the intended recipient. In determining the intended recipient, the call parking and paging system may use the identity of a person or group of persons assigned to the dialed extension 506L. However, the call parking and paging system may also request the caller to speak the name of an intended recipient. Based upon the spoken name, the call parking and paging system may use its voice processing system to determine an intended recipient from contents of an information database or directory system. Alternatively, the call parking and paging system may simply retain the spoken name of the intended recipient for inclusion within a voice page. In such an operation, the spoken name that is included in the voice page may also be used by the intended recipient to identify the caller, assisting the intended recipient in his or her decision to receive the parked call or to ignore the page.

Once the intended recipient has been determined, the call parking and paging system initiates the voice page over loudspeakers 508A–508D in an attempt to notify the intended recipient that he or she has a call parked. The call parking and paging system then waits for a response to the page. Should a response be received, the call parking entity delivers the call to a requested destination. However, should no response be received from the page, the call parking entity routes the call to the attendant, to voice mail or to another extension, based upon predetermined operations and/or input from the caller.

In an alternate example of operation of the call parking and paging system, a call is received by a call greeting system supported by the PBX 502. The caller is presented with a number of options by the call greeting system including the option of identifying an intended recipient for voice paging, for example, which invokes execution of the call parking and paging system. If the caller requests voice paging, the call parking and paging system next requires the caller to identify an intended recipient. The caller may use a voice processing system in conjunction with a directory system to determine the intended recipient. Once the intended recipient is identified, the call parking entity parks the call against one of a plurality of designated call parking extensions and routes the caller to the paging entity. The paging entity then issues a voice page based upon the intended recipient. Then, the paging entity and the call parking entity wait for a response to the page. If a response is received, the call is delivered from the designated call parking extension to the requesting party. If no response is received to the page, or if the caller cannot identify an intended recipient, the call is routed to the attendant, otherwise serviced or terminated.

In a particular operation of the call parking and paging system, a call is directed to an intended recipient that is currently on his or her phone within the office. Thus, the call cannot be delivered. The caller, however, determines that the call requires immediate delivery. So, instead of leaving a message, the caller requests that a page be sent to the intended recipient. Since the call parking and paging entity determines that the intended recipient is within his or her office, the call parking and paging entity first sends an email message to the intended recipient on a computer located within his or her office, notifying he or she that an important call is on park. Alternatively, a voice page is announced on a speaker serving the phone in his or her office. In each of these operations, an unnecessary voice page over the loudspeakers 508A–508D is avoided.

Figure 6:
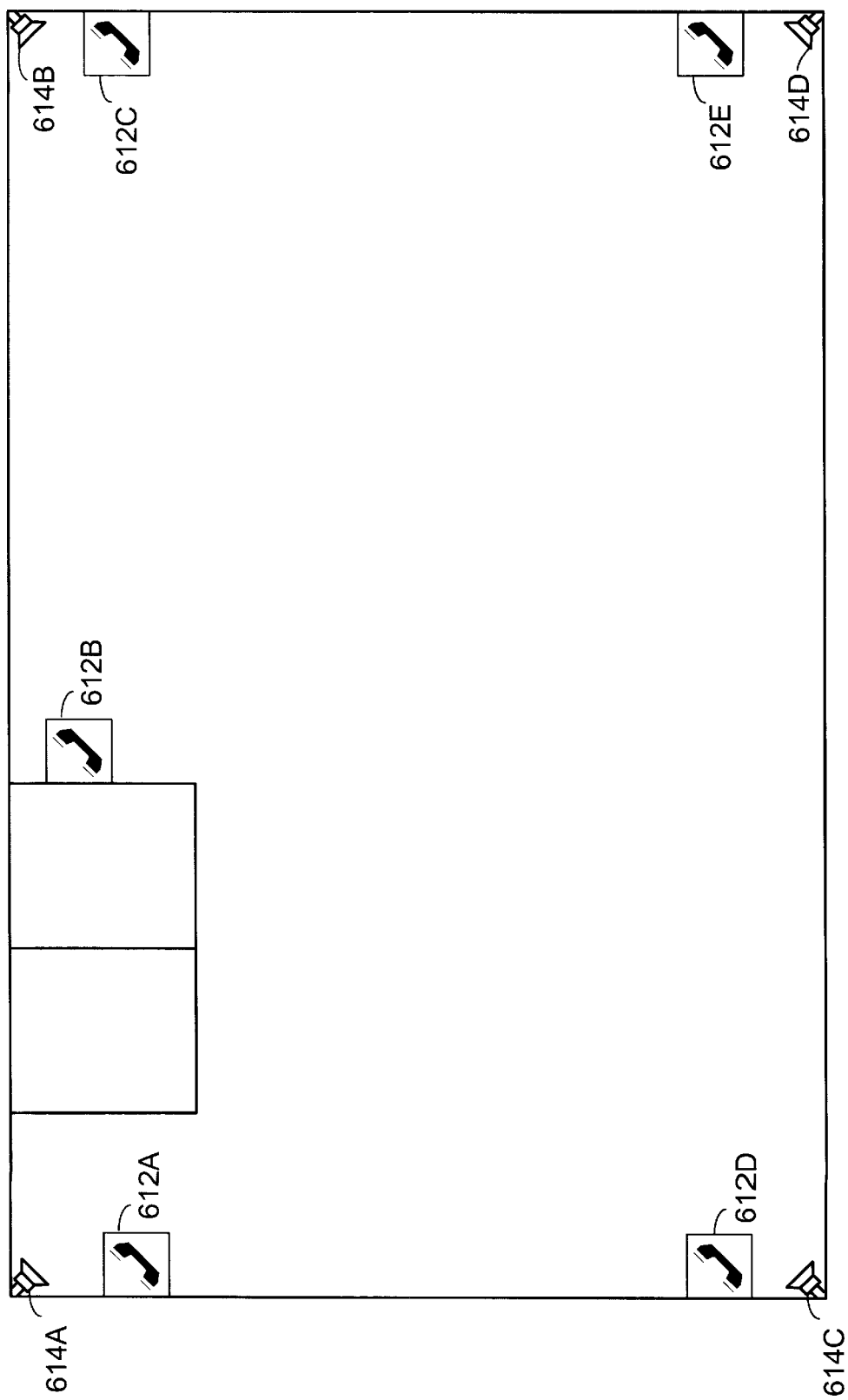
FIG. 6 is a diagram illustrating a single building premises in which loudspeakers and paging phones are installed, the loudspeakers and paging phones operable in conjunction with a call parking and paging system to deliver pages and parked calls.

FIG. 6 illustrates another installation of a call parking and paging system constructed according to the present invention. The installation 610 illustrated may be a hospital, a warehouse, a roller rink, a skating rink or another space used by an organization. In the installation, workers may spend a majority of their time away from their offices. Further, some workers may not even have an office. Thus, to reach any particular individual working within the facility, a page may be required. Further, in some cases, such as the case where the installation is a hospital, some calls are of such importance that they should be immediately delivered while other calls of lesser importance may be responded to later. With the call parking and paging system, calls with high priority may be processed in an attempt to deliver the calls to while calls of lesser importance may be delivered to the messaging system. As illustrated, the installation 610 services a relatively small number of extensions. Thus, the installation would typically not justify its own PBX and the services provided would be provided by the telephone system central exchange.

Located within the facility 610 are a plurality of paging extensions 612A–612E which may be used to receive parked calls. A plurality of loudspeakers 614A–614D are dispersed within the facility 610 so as to adequately project voice pages throughout the facility 610. When the call parking and paging system parks a call and determines that it should attempt to deliver the call to a called party, the call parking and paging system delivers a page over the loudspeakers 612A–612E, announcing the call to the intended recipient. The intended recipient then has a predetermined time period within which to access one of the extensions 612A–612E and receive the call. Upon accessing the extension 612A–612E to request delivery of the parked call, the call parking and paging system may require validation of the requesting party. Should a valid request for pick up be received, the call parking and paging system then delivers the call to the extension from which the request was received. However, should the pick up request prove invalid, the call will not be delivered to the extension. Alternatively, the intended recipient may request that the parked call be routed to the attendant, to the messaging system or to another destination via input provided at one of the extensions 612A–612E.

Figure 7:
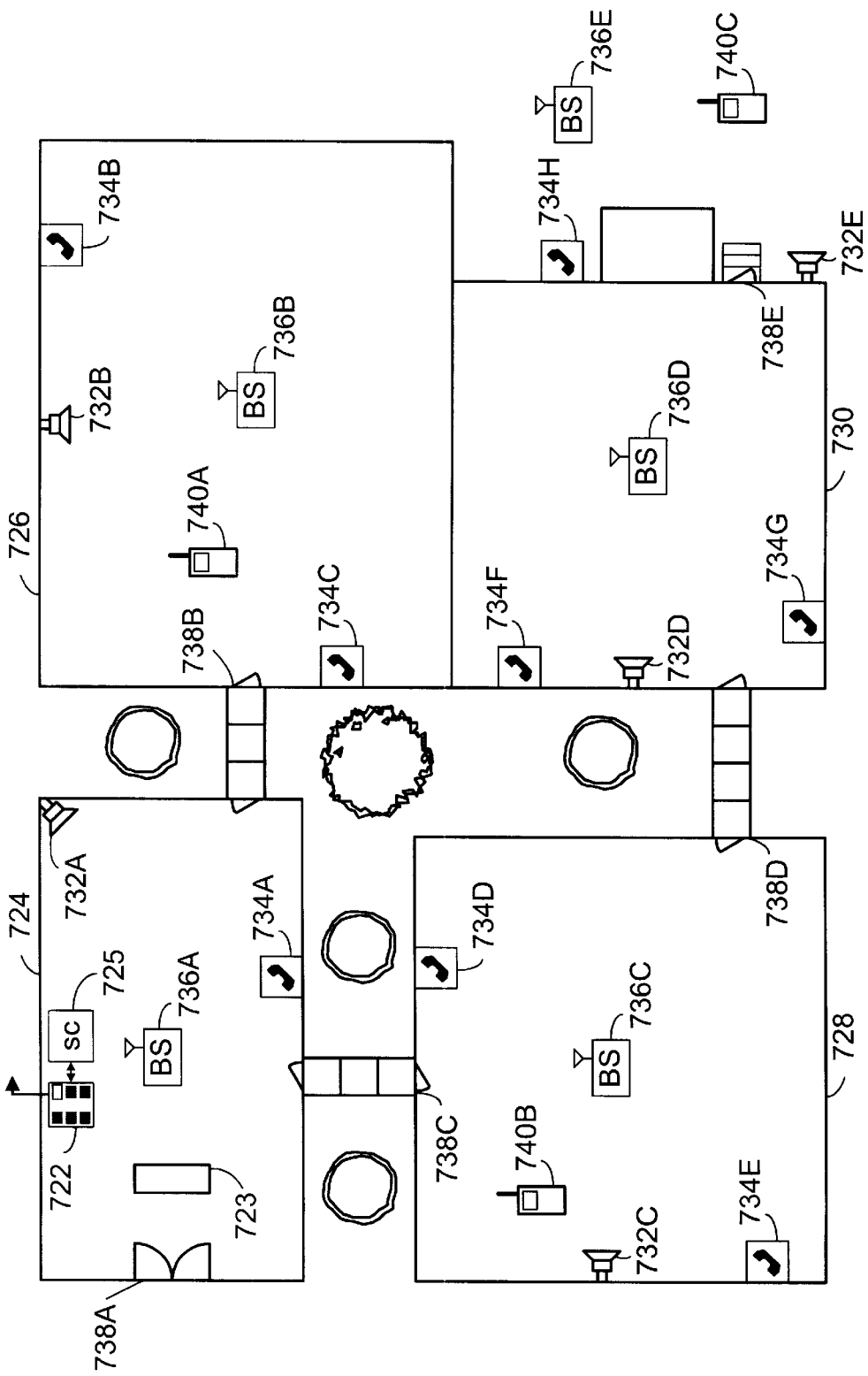
FIG. 7 is a diagram illustrating a multiple building premises in which a call parking and paging system operates in conjunction with a server computer, a security system and a wireless communication system to track locations of intended recipients, to selectively deliver parked calls via paging phones and to deliver parked calls to wireless units.

FIG. 7 illustrates another installation of a call parking and paging system constructed according to the present invention supported by a PBX 722. The PBX 722 couples to a server computer 725 which provides support in the operation of the call parking and paging system. As shown, the installation 720 is within a multiple building complex having buildings 724, 726, 728 and 730, each of which includes a single floor. The buildings 724–330 are coupled by corridors through which persons may travel when moving from building to building. Building 724 serves as the primary entrance for the complex and includes a main entry way 738A. An attendant station 723 is served by an attendant who also services attendant extensions for the PBX 722.

Each building within the complex includes voice paging resources. Building 724 includes a loudspeaker 732A and a paging phone 734A while building 726 includes a loudspeaker 734B and paging phones 734B and 734C. Further, building 728 includes loudspeaker 732C and paging phones 734D and 734E while building 730 includes loudspeaker 732D and paging phone 734G. Moreover, the building complex includes a loading dock attached to building 730 that is served by loudspeaker 732E and paging phone 734H. Thus, all areas of the building complex, including the loading dock are served by the PBX 722.

A security system for the building complex and supported by the server computer 725 requires radio frequency (RF) badges that register with the security system as personnel wearing the RF badges move into, within and out of the building complex. For example, an employee wearing an RF badge enters the building complex either via main entry 738A or loading dock entry 738E and passes by a respective RF badge reader. Upon entering the facility, an RF badge reader located at main entry 738A or loading dock entry 738E registers the badge and determine that the employee assigned the badge is within the building complex. Further, RF badge readers located at corridor entry/exit locations 738B, 738C and 738D monitor movement of the employee as the employee moves throughout the premises. Thus, at any particular time, the security system may determine in which building 724–730 the employee wearing the RF badge currently resides.

When the call parking and paging system is requested to issue a voice page, the PBX 722 may access the security system on the server computer 725 to determine in which building 724–730 an intended recipient of the page resides. For example, should the recipient reside within building 726, the paging entity directs a voice page to loudspeaker 732B. Upon hearing the page, the intended recipient may pick up paging phone 734B or 734C and request pick up of the parked call. Should validation be required, the validation entity validates the party requesting delivery of the parked call. When the requesting party is properly validated, the call parking entity delivers the parked call. The security system also determines whether the employee is even present within the building complex and relates this information to the call parking and paging system. Should the employee not be located within the facility, the call parking and paging system determines that a page at the loading dock via loudspeaker 732E is warranted (should the employee likely be there) or that no page is warranted and the caller be directed to leave a message.

In another operation within the installation 720, an intended recipient carries a premises based wireless phone such as the Nortel Companion phone. A plurality of wireless base stations 736A, 736B, 736C, 736D and 736E, that may operate compliant with IEEE 802.11 standards, support the premises based wireless communication within the buildings 724–330 as well as in an area proximate to the loading dock. Mobile terminals 740A, 740B and 740C communicate with proximally located base stations 736B, 736C and 736E, respectively. As the mobile terminals 740A, 740B and 740C move about the installation 720, they are handed off from base station to base station, preferably establishing communication with a nearest base station. Thus, at any given time, the wireless network may determine to which base station 736A–736E the mobile terminals 740A–740C are currently attached.

In an example of operation of the PBX 722 in conjunction with the premises based phone system, the call parking and paging system receives a call for an intended recipient, parks the call and attempts to determine the location of the intended recipient. A query of the security system indicates that the intended recipient is not within the complex. However, the PBX 722 also determines that the intended recipient has been assigned a premises based wireless phone and queries the wireless network via the server computer 725 for the whereabouts of the intended recipient. The wireless network responds to the PBX 722 via the server computer 725 that the assigned wireless phone currently is attached to base station 736E on the loading dock. Based upon the location information, the PBX 722 issues a voice page via loudspeaker 732E on the loading dock. The intended recipient may then receive the parked call via paging phone 734H. In another example of operation of the PBX 722 in conjunction with the premises based phone system, the PBX 722 delivers the parked call to the intended recipient via the intended recipient's premises based wireless phone without parking the call and issuing a page.

In still another embodiment, global positioning system (GPS) receivers may be used in conjunction with the call parking and paging system of the present invention to provide location information of intended recipients that may be used to direct pages. This application would have particular usefulness when a served premises or served area covers a large area, such as in a factory environment. Periodically, or substantially continually, a wireless unit carried by a user transmits a user's location, as determined by a coupled GPS receiver, to the information data base. Then, when the call parking and paging system desires to issue a voice page to the user, the call parking and paging system directs the voice page to a current location of the user (intended recipient).

Figure 8:
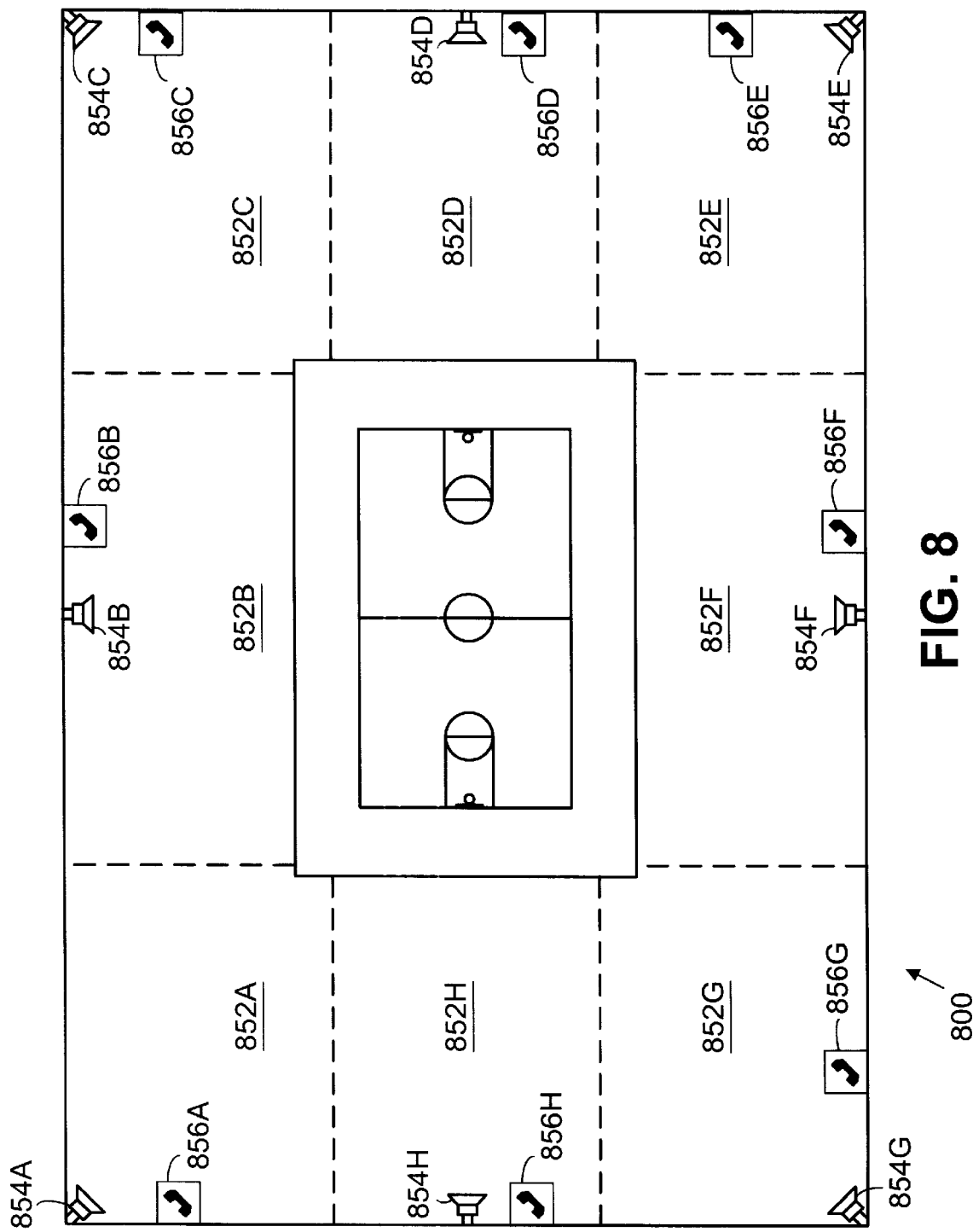
FIG. 8 is a diagram of a sports complex in which a call parking and paging system operates to provide call parking and paging functions.

FIG. 8 illustrates an installation of a call parking and paging system within a sports arena 800. The installation includes a plurality of paging areas 852A–852H that segregate the sports arena 800 for purposes of sending voice pages and delivering parked calls. The installation also includes a plurality of paging phones 856A–856H dispersed throughout the sports arena in a manner corresponding to the plurality of loudspeakers 854A–354H. While a single level of the sports arena is illustrated, the sports arena includes other levels and areas aside from the illustrated seating areas. These areas are also segregated into paging areas that are supported by respective loudspeakers and paging phones. The call parking and paging system may be supported by a PBX of by the telephone company central exchange.

In one operation, an incoming call is intended for a recipient that works in the sports complex and that has a designated extension but does not pick up at the designated extension. The call parking entity parks the call against a designated resource and invokes the paging entity to issue a voice page. Without further location information for the intended recipient, the paging entity issues a broadcast voice page on all loudspeakers 854A–854H and waits for a response. When a request is made to deliver the parked call, the validation entity may validate the party requesting delivery prior to delivery. Then, the call parking entity delivers the call to the requesting party.

In another example of operation of the installation 850, an incoming call is received by the PBX at a general voice paging number. The call parking entity parks the call and notifies the paging entity to deliver a page to an intended recipient identified by the caller. However, the paging entity desires to deliver the page only to the paging area in which the intended recipient most likely is located. Thus, the paging entity may perform cross referencing in an attempt to limit the number of paging areas 852A–852H within which the page is delivered. In determining particular paging areas in which to deliver the page, the paging entity uses the identity of the intended recipient. Should the intended recipient be an employee with a specific assigned location, the paging entity determines the location, cross references the location to the paging areas and delivers the page to one or more paging areas corresponding to the work area of the employee. For example, if the employee sells refreshments in paging area 852F, the voice page is delivered only in paging area 852F. However, if the employee is a security guard assigned to the paging areas 852A–852C, the page is delivered to each of the paging area 852A–852C.

The call parking and paging system also determines paging areas to which deliver pages based upon the ticket(s) held by the intended recipient by interfacing with a sever computer that supports a ticketing system that issued seats within the a sports arena. In the ticketing system, names of purchasers of the tickets are identified and records are retained that may be used to cross-reference ticket purchasers with their assigned seats. Thus, by accessing the server computer that services the ticketing system, the call parking and paging system may cross reference an intended recipient's name to a seat purchased by, or assigned to the intended recipient. The call parking and paging system then cross references the assigned seat to one or more of the paging areas 852A–852H and sends the page from a corresponding loudspeaker.

In delivering parked calls to one or more of the paging phones 856A–856H, the call parking and paging system may validate the identity of a requesting party prior to delivering the call. Further, the call parking and paging system may deliver calls only to paging phones corresponding to particular paging areas. For example, if a page was delivered via loudspeaker 854B, the call parking and paging system may authorize delivery of the parked call only to paging phone 856B.

From the detailed description of the present invention and associated drawings described above, it is clear that other modifications and variations will be apparent to those skilled in the art. It should also be apparent that such other modifications and variations may be effected without departing from the spirit and scope of the present invention as set forth in the claims which follow.

What is claimed is:

1. A premises based call parking and paging system that serves a plurality of possible intended recipients, the call parking and paging system comprising:

a switch that receives a call from a caller on a telephone number corresponding to a plurality of possible intended recipients, wherein a first set of the plurality of possible intended recipients are assigned telephone extensions that are coupled to the switch, and wherein a second set of the plurality of possible intended recipients are not assigned telephone extensions;

a directory system coupled to the switch that interacts with the caller to allow the caller to identify an intended recipient from the plurality of possible intended recipients;

a call parking entity coupled to the switch;

a paging entity coupled to the switch;

wherein, when the intended recipient is one of the first set of the plurality of possible intended recipients, the switch routes the call to a corresponding assigned telephone extension;

wherein, when the intended recipient is one of the second set of the plurality of possible intended recipients, the switch routes the call to the call parking entity, the call parking entity automatically parks the call, and the paging entity provides a voice announcement corresponding to the intended recipient of the call;

wherein, when the intended recipient is one of the first set of the plurality of possible intended recipients and the intended recipient does not receive the call at the corresponding assigned telephone extension, the switch optionally routes the call to the call parking entity, the call parking entity automatically parks the call, and the paging entity provides a voice announcement corresponding to the intended recipient of the call; and the call parking entity, upon receipt of a response from the intended recipient, delivering the call to the intended recipient.

2. The call parking and paging system of claim 1, further comprising a messaging system, wherein the call parking entity delivers the call to the messaging system when the intended recipient does not respond to the voice announcement.

3. The call parking and paging system of claim 1, wherein the call parking entity parks the call against a designated resource automatically selected from a plurality of designated resources.

4. The call parking and paging system of claim 1, wherein, when the intended recipient does not answer the voice announcement, the call parking and paging system allows the caller to select another intended recipient.

5. The call parking and paging system of claim 1, wherein, after the paging entity provides the voice announcement, the call is delivered to one of a plurality of designated paging extensions.

6. The call parking and paging system of claim 1, further comprising a validation entity that validates a request to deliver the call in response to the voice announcement.

7. The call parking and paging system of claim 1, further comprising a validation entity that validates the caller's selection of the intended recipient.

8. The call parking and paging system of claim 1, wherein the directory system includes a voice processing system that receives voice input from the caller and determines the intended recipient based upon the voice input.

9. The call parking and paging system of claim 1, wherein the directory system provides a listing of the plurality of possible intended recipients from which the caller may select the intended recipient.

10. The call parking and paging system of claim 9, further comprising a voice processing system used in conjunction with the directory system to select the intended recipient.

11. The call parking and paging system of claim 1, further comprising a server computer interface that allows the call parking and paging system to interface with a server computer.

12. The call parking and paging system of claim 11, wherein:

the paging entity interacts with the server computer to determine a paging area corresponding to a most likely physical location of the intended recipient; and the paging entity delivers the voice announcement to the paging area corresponding to the most likely physical location of the intended recipient.

13. The call parking and paging system of claim 11, wherein the paging entity is communicatively coupled to a security system and the security system determines the most likely physical location of the intended recipient within a premises served by the security system.

14. The call parking and paging system of claim 11, wherein:

the server computer provides cross reference information between the intended recipient and a plurality of paging areas; and the paging entity directs a page to at least one paging area of the plurality of paging areas based upon the cross reference information.

15. The call parking and paging system of claim 1, wherein the call parking entity delivers the call to an attendant when the voice announcement is not answered.

16. The call parking and paging system of claim 1, further comprising an interface to a premises based wireless network.

17. The call parking and paging system of claim 16, wherein:

the paging entity determines a physical location of the intended recipient based upon interaction with the premises based wireless network; and the paging entity delivers the voice announcement based upon the physical location of the intended recipient.

18. The call parking and paging system of claim 16, wherein the call parking entity delivers the call to a mobile unit supported by the premises based wireless network when the intended recipient does not respond to the voice announcement.

19. A method of servicing a call incoming to a premises, the method comprising:

receiving a call from a caller on a telephone number corresponding to a plurality of possible intended recipients, wherein a first set of the plurality of possible intended recipients are assigned telephone extensions, and wherein a second set of the plurality of possible intended recipients are not assigned telephone extensions;

interacting with the caller to allow the caller to identify an intended recipient from the plurality of possible intended recipients;

when the intended recipient is one of the first set of the plurality of possible intended recipients, routing the call to a corresponding assigned telephone extension;

when the intended recipient is one of the second set of the plurality of possible intended recipients, parking the call and providing a voice announcement corresponding to the intended recipient of the call;

when the intended recipient is one of the first set of the plurality of possible intended recipients and the intended recipient does not receive the call at the corresponding assigned telephone extension, optionally parking the call and providing a voice announcement corresponding to the intended recipient of the call; and upon receipt of a response from the intended recipient, delivering the call to the intended recipient.

20. The method of claim 19, further comprising delivering the call to a messaging system when the intended recipient does not respond to the voice announcement.

21. The method of claim 19, wherein the call is parked against a designated resource selected from a plurality of designated resources.

22. The method of claim 19, further comprising, after a timeout period within which the intended recipient does not answer the voice announcement, allowing the caller to select another intended recipient.

23. The method of claim 19, further comprising delivering the call to one of a plurality of designated paging extensions based upon a response from the intended recipient.

24. The method of claim 19, further comprising validating the caller's selection of the intended recipient.

25. The method of claim 24, wherein validating the caller's selection of the intended recipient employs voice processing.

26. The method of claim 19, further comprising validating a request to receive the call.

27. The method of claim 26, wherein validating a request to receive the call employs voice processing.

28. The method of claim 19, wherein the caller selects the intended recipient of the call from a directory.

29. The method of claim 28, wherein voice processing is employed to allow the caller to select the intended recipient.

30. The method of claim 19, further comprising determining a potential location of the intended recipient.

31. The method of claim 30, further comprising delivering the voice announcement based upon the potential location of the intended recipient.

32. The method of claim 30, wherein determining the potential location of the intended recipient includes interacting with a server computer.

33. The method of claim 30, further comprising cross referencing an identity of the intended recipient to stored data to determine the potential location of the intended recipient within at least one a paging area of a plurality of paging areas and directing the voice announcement to the at least paging area based upon the potential location.

34. The method of claim 19, further comprising delivering the incoming call to an attendant when the voice announcement is not answered.

35. The method of claim 19, further comprising:
determining a potential location of the intended recipient based upon interaction with a premises based wireless network; and
delivering the voice announcement based upon the potential location.

36. The method of claim 35, further comprising delivering the incoming call to a mobile unit supported by the premises based wireless network.

37. The method of claim 19, wherein the call is received from the public switched telephone network.

38. The method of claim 19, wherein the call is received from a call greeting system.

39. The method of claim 19, wherein the call is received by direct dial access.

40. The method of claim 19, wherein the call is received upon a transfer from an non-answering serviced extension.

41. The method of claim 40, wherein the intended recipient is determined based upon an identity of the non-answering serviced extension.

42. The method of claim 19, further comprising notifying the intended recipient of the call using a non-voice message.

43. The method of claim 42, wherein the non-voice message is selected from the group consisting of email, a call waiting light, a call waiting display and a call waiting tone indication.

44. The method of claim 29, wherein the intended recipient is determined based upon a spoken name of the intended recipient.

45. A computer readable medium that is readable by a premises based telephone switch, the computer readable medium comprising:
a first set of instructions that, when executed by the premises based telephone switch, cause the premises based telephone switch to receive a call from a caller on a telephone number corresponding to a plurality of possible intended recipients, wherein a first set of the plurality of possible intended recipients are assigned telephone extensions serviced by the premises based telephone switch, and wherein a second set of the plurality of possible intended recipients are not assigned telephone extensions;

a second set instructions that, when executed by the premises based telephone switch, cause the premises based telephone switch to interact with the caller to allow the caller to identify an intended recipient from the plurality of possible intended recipients;

a third set of instructions that, when executed by the premises based telephone switch, cause the premises based telephone switch to, when the intended recipient is one of the first set of the plurality of possible intended recipients, route the call to a corresponding assigned telephone extension;

a fourth set of instructions that, when executed by the premises based telephone switch, cause the premises based telephone switch to, when the intended recipient is one of the second set of the plurality of possible intended recipients, park the call and provide a voice announcement corresponding to the intended recipient of the call;

a fifth set of instructions that, when executed by the premises based telephone switch, cause the premises based telephone switch to, when the intended recipient is one of the first set of the plurality of possible intended recipients and the intended recipient does not receive the call at the corresponding assigned telephone extension, optionally park the call and provide a voice announcement corresponding to the intended recipient of the call; and a sixth set of instructions that, when executed by the premises based telephone switch, cause the premises based telephone switch to, upon receipt of a response from the intended recipient, deliver the call to the intended recipient.

46. The computer readable medium of claim 45, further comprising a seventh set instructions that, when executed by the premises based telephone switch, cause the premises based telephone switch to deliver the call to a messaging system when the intended recipient does not respond to voice announcement.

47. The computer readable medium of claim 45, wherein the call is parked against a designated resource that is automatically selected from a plurality of designated resources.

48. The computer readable medium of claim 45, further comprising a seventh set of instructions that, when executed by the premises based telephone switch, cause the premises based telephone switch to, when the intended recipient does not answer the voice announcement, allow the caller to select another intended recipient.

49. The computer readable medium of claim 45, further comprising a seventh set of instructions that, when executed by the premises based telephone switch, cause the premises based telephone switch to deliver the call to one of a plurality of designated paging extensions.

50. The computer readable medium of claim 45, further comprising a seventh set of instructions that, when executed by the premises based telephone switch, cause the premises based telephone switch to validate the caller's selection of the intended recipient.

51. The computer readable medium of claim 50, wherein validating the caller's selection of the intended recipient employs voice processing.

52. The computer readable medium of claim 45, further comprising a seventh set of instructions that, when executed by the premises based telephone switch, cause the premises based telephone switch to validate a voice announcement request.

53. The computer readable medium of claim 52, wherein the premises based telephone switch employs voice processing to validate the voice announcement request.

54. The computer readable medium of claim 45, further comprising a seventh set of instructions that, when executed by the premises based telephone switch, cause the premises based telephone switch to provide a directory from which the intended recipient may be selected.

55. The computer readable medium of claim 54, wherein selection of the intended recipient employs voice processing.

56. The computer readable medium of claim 45, further comprising a seventh set of instructions that, when executed by the premises based telephone switch, cause the premises based telephone switch to determine a potential location of the intended recipient.

57. The computer readable medium of claim 56, further comprising an eighth set of instructions that, when executed by the premises based telephone switch, cause the premises based telephone switch to deliver the voice announcement based upon the potential location of the intended recipient.

58. The computer readable medium of claim 56, further comprising an eighth set of instructions that, when executed by the premises based telephone switch, cause the premises based telephone switch to interact with a security system to determine the potential location of the intended recipient.

59. The computer readable medium of claim 56, further comprising an eighth set of instructions that, when executed by the premises based telephone switch, cause the premises based telephone switch to cross reference an identity of the intended recipient to stored data to determine the potential location of the intended recipient and to direct the voice announcement to at least paging area based upon the potential location.

60. The computer readable medium of claim 45, further comprising a seventh set of instructions that, when executed by the premises based telephone switch, cause the premises based telephone switch to deliver the call to an attendant when the voice announcement is not answered.

61. The computer readable medium of claim 45, further comprising a seventh set of instructions that, when executed by the premises based telephone switch, cause the premises based telephone switch to determine a potential location of the intended recipient based upon interaction with a premises based wireless network and to deliver the voice announcement based upon the potential location.

62. The computer readable medium of claim 61, further comprising an eighth set of instructions that, when executed by the premises based telephone switch, cause the premises based telephone switch to further deliver the call to a mobile unit supported by the premises based wireless network.

63. A private branch exchange that services a premises, comprising:
 a switch that receives a call from a caller on a telephone number corresponding to a plurality of possible intended recipients and that routes the call, wherein a first set of the plurality of possible intended recipients are assigned telephone extensions that are coupled to the switch, and wherein a second set of the plurality of possible intended recipients are not assigned telephone extensions;
 a call parking entity coupled to the switch;
 a directory system coupled to the switch that interacts with the caller to allow the caller to identify an intended recipient from the plurality of possible intended recipients;
 a paging entity coupled to the switch;
 wherein, when the intended recipient is one of the first set of the plurality of possible intended recipients, the switch routes the call to a corresponding assigned telephone extension;
 wherein, when the intended recipient is one of the second set of the plurality of possible intended recipients, the switch routes the call to the call parking entity, the call parking entity automatically parks the call, and the paging entity provides a voice announcement corresponding to the intended recipient of the call;
 wherein, when the intended recipient is one of the first set of the plurality of possible intended recipients and the intended recipient does not receive the call at the corresponding assigned telephone extension, the switch optionally routes the call to the call parking entity, the call parking entity automatically parks the call, and the paging entity provides a voice announcement corresponding to the intended recipient of the call; and
 the call parking entity, upon receipt of a response from the intended recipient, delivering the call to the intended recipient.

64. The private branch exchange of claim 63, further comprising a messaging system, wherein the call parking entity delivers the call to the messaging system when the intended recipient does not respond to the voice announcement.

65. The private branch exchange of claim 63, wherein the call parking entity parks the call against a designated resource automatically selected from a plurality of designated resources.

66. The private branch exchange of claim 63, wherein, when the intended recipient does not answer the voice announcement, the directory system allows the caller to select another intended recipient.

67. The private branch exchange of claim 66, wherein the call is delivered to one of a plurality of designated paging extensions.

68. The private branch exchange of claim 63, further comprising a validation entity that validates the request for delivery.

69. The private branch exchange of claim 63, further comprising a validation entity that validates the caller's selection of the intended recipient.

70. The private branch exchange of claim 63, further comprising a voice processing system used in conjunction with the directory system to determine the intended recipient based upon the voice input.

71. The private branch exchange of claim 63, wherein the directory system provides a listing of the plurality of possible intended recipients from which the caller may select the intended recipient.

72. The private branch exchange of claim 71, further comprising a voice processing system used in conjunction with the directory system to select the intended recipient.

73. The private branch exchange of claim 63, further comprising a server computer interface that allows the telephone switch to interface with a server computer.

74. The private branch exchange of claim 73, wherein:
 the paging entity interacts with the server computer to determine a voice announcement zone corresponding to a most likely physical location of the intended recipient; and the paging entity delivers the voice announcement to the voice announcement zone corresponding to the most likely physical location of the intended recipient.

75. The private branch exchange of claim 74, wherein the server computer supports a security system and the security system determines the most likely physical location of the intended recipient within a premises served by the security system.

76. The private branch exchange of claim 73, where:

the server computer provides cross reference information between intended recipients and a plurality of paging areas; and the paging entity directs a page to at least one paging area of the plurality of paging areas based upon the cross reference information.

77. The private branch exchange of claim 63, wherein the call parking entity delivers the call to an attendant when the voice page is not answered.

78. The private branch exchange of claim 63, further comprising an interface to a premises based wireless network.

79. The private branch exchange of claim 78, wherein:

the paging entity determines a physical location of an intended recipient based upon interaction with the premises based wireless network; and the paging entity delivers the voice announcement based upon the physical location of the intended recipient.

80. The private branch exchange of claim 78, wherein the call parking entity delivers the call to a mobile unit supported by the premises based wireless network when the intended recipient does not respond to the voice announcement.

81. The private branch exchange of claim 63, wherein the private branch exchange is installed within a central office of a telephone service provider.

82. The private branch exchange of claim 63, wherein the private branch exchange resides within the premises.

\* \* \* \* \*